United States Patent
Bae et al.

(10) Patent No.: US 12,513,751 B2
(45) Date of Patent: *Dec. 30, 2025

(54) METHODS AND APPARATUS FOR RANDOM ACCESS WITH CONTENTION RESOLUTION MESSAGE REPETITION

(71) Applicant: Samsung Electronics Co., Ltd., Suwon-si (KR)

(72) Inventors: Jung Hyun Bae, San Diego, CA (US); Mohammed Karmoose, San Diego, CA (US); Yaser Mohamed Mostafa Kamal Fouad, San Diego, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/387,444

(22) Filed: Nov. 6, 2023

(65) Prior Publication Data
US 2024/0080909 A1    Mar. 7, 2024

Related U.S. Application Data

(63) Continuation of application No. 17/233,435, filed on Apr. 16, 2021, now Pat. No. 11,812,477.

(Continued)

(51) Int. Cl.
*H04W 74/0833*     (2024.01)
*H04L 1/1867*      (2023.01)
(Continued)

(52) U.S. Cl.
CPC ......... *H04W 74/0841* (2013.01); *H04L 1/189* (2013.01); *H04W 8/24* (2013.01); *H04W 72/1268* (2013.01); *H04W 74/0833* (2013.01)

(58) Field of Classification Search
None
See application file for complete search history.

(56) References Cited

U.S. PATENT DOCUMENTS 10,085,254 B2    9/2018  Yi et al.
11,812,477 B2 *  11/2023 Bae .................. H04W 72/1268
(Continued)

FOREIGN PATENT DOCUMENTS

CN    112040558 A    12/2020
KR    20200025437 A   3/2020
(Continued)

OTHER PUBLICATIONS

3GPP, "3rd Generation Partnership Project; Technical Specification Group Radio Access Network; NR; Medium Access Control (MAC) protocol specification (Release 16)", 3GPP TS 38.321 V16.0.0, Technical Specification, Mar. 2020, 141 pages.

(Continued)

*Primary Examiner* — Lonnie V Sweet
(74) *Attorney, Agent, or Firm* — Renaissance IP Law Group LLP

(57) ABSTRACT

A method may include sending a contention resolution message for a random access procedure from a user equipment (UE) through a physical uplink channel in a wireless communication network, and sending a repetition of the contention resolution message from the UE through the physical uplink channel. The physical uplink channel may include a physical uplink shared channel (PUSCH). The method may further include selecting a preamble from a first preamble group corresponding to a capability of the UE to send the repetition of the contention resolution message, and sending the preamble from the UE. Selecting the preamble from the first preamble group may include selecting a preamble from a first preamble sub-group corresponding to (Continued)

the capability of the UE to send the repetition of the contention resolution message.

20 Claims, 15 Drawing Sheets

Related U.S. Application Data

(60) Provisional application No. 63/134,580, filed on Jan. 6, 2021, provisional application No. 63/021,078, filed on May 6, 2020.

(51) Int. Cl.
*H04W 8/24* (2009.01)
*H04W 72/1268* (2023.01)

(56) References Cited

U.S. PATENT DOCUMENTS

| | | | |
|---|---|---|---|
| 12,015,485 B2* | 6/2024 | Liang | H04W 74/0833 |
| 2016/0295609 A1 | 10/2016 | Vajapeyam et al. | |
| 2017/0347361 A1* | 11/2017 | Tsuboi | H04W 72/54 |
| 2017/0366999 A1* | 12/2017 | Tsuboi | H04W 24/10 |
| 2018/0020378 A1* | 1/2018 | Tsuboi | H04L 1/203 |
| 2019/0075593 A1* | 3/2019 | Mauritz | H04W 74/085 |
| 2019/0223157 A1 | 7/2019 | Hwang et al. | |
| 2019/0223224 A1 | 7/2019 | Park et al. | |
| 2019/0261407 A1 | 8/2019 | Irukulapati et al. | |
| 2019/0342921 A1 | 11/2019 | Loehr et al. | |
| 2020/0107375 A1* | 4/2020 | Lee | H04L 1/1896 |
| 2020/0128588 A1 | 4/2020 | Xiong et al. | |
| 2020/0187242 A1* | 6/2020 | Höglund | H04W 52/365 |
| 2020/0214044 A1 | 7/2020 | Qian et al. | |
| 2020/0351853 A1 | 11/2020 | Xiong et al. | |
| 2020/0367290 A1* | 11/2020 | Mazloum | H04L 47/283 |
| 2021/0007147 A1 | 1/2021 | Yang et al. | |
| 2021/0045160 A1* | 2/2021 | Irukulapati | H04W 74/006 |
| 2022/0030607 A1* | 1/2022 | Liu | H04W 72/23 |
| 2022/0131652 A1* | 4/2022 | Bae | H04L 5/1469 |

FOREIGN PATENT DOCUMENTS

| | | |
|---|---|---|
| WO | 2018230995 A1 | 12/2018 |
| WO | 2019149894 A1 | 8/2019 |
| WO | 2019191928 A1 | 10/2019 |
| WO | 2019216818 A1 | 11/2019 |

OTHER PUBLICATIONS

3GPP, "3rd Generation Partnership Project; Technical Specification Group Radio Access Network; NR; Multiplexing and channel coding (Release 16)", 3GPP TS 38.212 V16.1.0, Technical Specification, Mar. 2020, 146 pages.

3GPP, "3rd Generation Partnership Project; Technical Specification Group Radio Access Network; NR; Physical channels and modulation (Release 16)", 3GPP TS 38.211 V16.1.0, Technical Specification, Mar. 2020, 130 pages.

3GPP, "3rd Generation Partnership Project; Technical Specification Group Radio Access Network; NR; Physical layer procedures for data (Release 16)", 3GPP TS 38.214 V16.1.0, Technical Specification, Mar. 2020, 151 pages.

3GPP, "3rd Generation Partnership Project; Technical Specification Group Radio Access Network; NR; Physical layer procedures for control (Release 16)", 3GPP TS 38.213 V16.1.0, Technical Specification, Mar. 2020, 156 pages.

3GPP, "3rd Generation Partnership Project; Technical Specification Group Radio Access Network; NR; Radio Resource Control (RRC) protocol specification (Release 16)", 3GPP TS 38.331 V16.0.0, Technical Specification, Mar. 2020, 835 pages.

Advisory Action for U.S. Appl. No. 17/233,435, mailed Apr. 5, 2023, 3 pages.

Ericsson, "Remaining Issues on Random Access for Rel-13 Low Complexity and Enhanced Coverage UEs," 3GPP TSG-RAN WG2 #92, Tdoc R2-156774, Nov. 2015, 10 pages.

Final Office Action for U.S. Appl. No. 17/233,435, mailed Jan. 12, 2023, 21 pages.

Notice of Allowance for U.S. Appl. No. 17/233,435, mailed Jun. 30, 2023, 13 pages.

Office Action for U.S. Appl. No. 17/233,435, mailed Sep. 1, 2022, 17 pages.

* cited by examiner

METHODS AND APPARATUS FOR RANDOM ACCESS WITH CONTENTION RESOLUTION MESSAGE REPETITION

CROSS-REFERENCE TO RELATED APPLICATION

This application is a continuation of U.S. patent application Ser. No. 17/233,435, filed Apr. 16, 2021, which claims priority to, and the benefit of, U.S. Provisional Patent Application Ser. No. 63/021,078 filed May 6, 2020, and U.S. Provisional Patent Application Ser. No. 63/134,580 filed Jan. 6, 2021, all of which are incorporated by reference.

TECHNICAL AREA

This disclosure relates generally to wireless networks, and specifically to methods and apparatus for random access with contention resolution message repetition.

BACKGROUND

A wireless network may implement a random access procedure to enable a user equipment (UE) such as a cellular handset to establish a connection with a base station. During a random access procedure, a UE may send a contention resolution message to a base station.

The above information disclosed in this Background section is only for enhancement of understanding of the background of the invention and therefore it may contain information that does not constitute prior art.

SUMMARY

A method may include sending a contention resolution message for a random access procedure from a user equipment (UE) through a physical uplink channel in a wireless communication network, and sending a repetition of the contention resolution message from the UE through the physical uplink channel. The physical uplink channel may include a physical uplink shared channel (PUSCH). The method may further include selecting a preamble from a first preamble group corresponding to a capability of the UE to send the repetition of the contention resolution message, and sending the preamble from the UE. Selecting the preamble from the first preamble group may include selecting a preamble from a first preamble sub-group corresponding to the capability of the UE to send the repetition of the contention resolution message. The method may further include selecting a first set of resources for a preamble transmission corresponding to a capability of the UE to send the repetition of the contention resolution message, and sending a preamble from the UE using the first set of resources. The contention resolution message may be sent using a first set of resources. The repetition of the contention resolution message may be sent using a second set of resources. The first set of resources may be configured substantially independently of the second set of resources. A portion of the first set of resources may be configured substantially the same as a portion of the second set of resources. The first set of resources may include a first repetition value (RV), and the second set of resources may include a second RV that may be different from the first RV, The first set of resources may include a first RV, and the second set of resources may include a second RV that may be the same as the first RV. The first set of resources may have a first configuration for a first transmission comprising the contention resolution message, and the first set of resources may have a second configuration for a second transmission comprising the contention resolution message, wherein the second configuration may be substantially different from the first configuration. The first set of resources may have a first configuration for a first transmission comprising the contention resolution message, and the first set of resources may have a second configuration for a second transmission comprising the contention resolution message, wherein the second configuration may be substantially the same as the first configuration. The first set of resources may include an RV index. The method may further include configuring the RV index dynamically. The method may further include configuring the RV index semi-statically. The first set of resources may include a demodulation reference signal (DMRS) configuration. The method may further include sending to the UE an index to one or more resources of the first set of resources. The method may further include monitoring a response based on completion of sending the contention resolution message. The method may further include monitoring a response based on completion of sending the repetition of the contention resolution message. The method may further include performing a power adaptation for the physical uplink channel. The method may further include configuring a first set of parameters for the power adaptation, and configuring a second set of parameters for the power adaptation. The UE may include a first UE, the contention resolution message may include a first contention resolution message, and the method may further include using the first set of parameters to send the first contention resolution message from the first UE using the physical uplink channel, and using the second set of parameters to send a second contention resolution message from a second UE through the physical uplink channel. The method may further include changing one or more of the parameters between the contention resolution message and the repetition of the contention resolution message.

An apparatus may include a user equipment (UE) for a wireless communication network, the UE including a controller configured to send a contention resolution message for a random access procedure through a physical uplink channel in the wireless communication network, and send a repetition of the contention resolution message through the physical uplink channel. The physical uplink channel may include a physical uplink shared channel (PUSCH).

An apparatus may include a base station for a wireless communication network, the base station including a controller configured to receive a contention resolution message for a random access procedure through a physical uplink channel in the wireless communication network, and receive a repetition of the contention resolution message through the physical uplink channel. The physical uplink channel may include a physical uplink shared channel (PUSCH).

A method may include sending a contention resolution message for a random access procedure from a user equipment (UE) through a physical uplink channel in a wireless communication network, and performing a power adaptation for the physical uplink channel based on sending the contention resolution message. The method may further include configuring a first set of parameters for the power adaptation, and configuring a second set of parameters for the power adaptation.

BRIEF DESCRIPTION OF THE DRAWINGS

The figures are not necessarily drawn to scale and elements of similar structures or functions are generally represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

FIG. 36 illustrates an example embodiment of HARQ uplink scheduling in accordance with example embodiments of the disclosure.

DETAILED DESCRIPTION

Overview

Figure 1A:
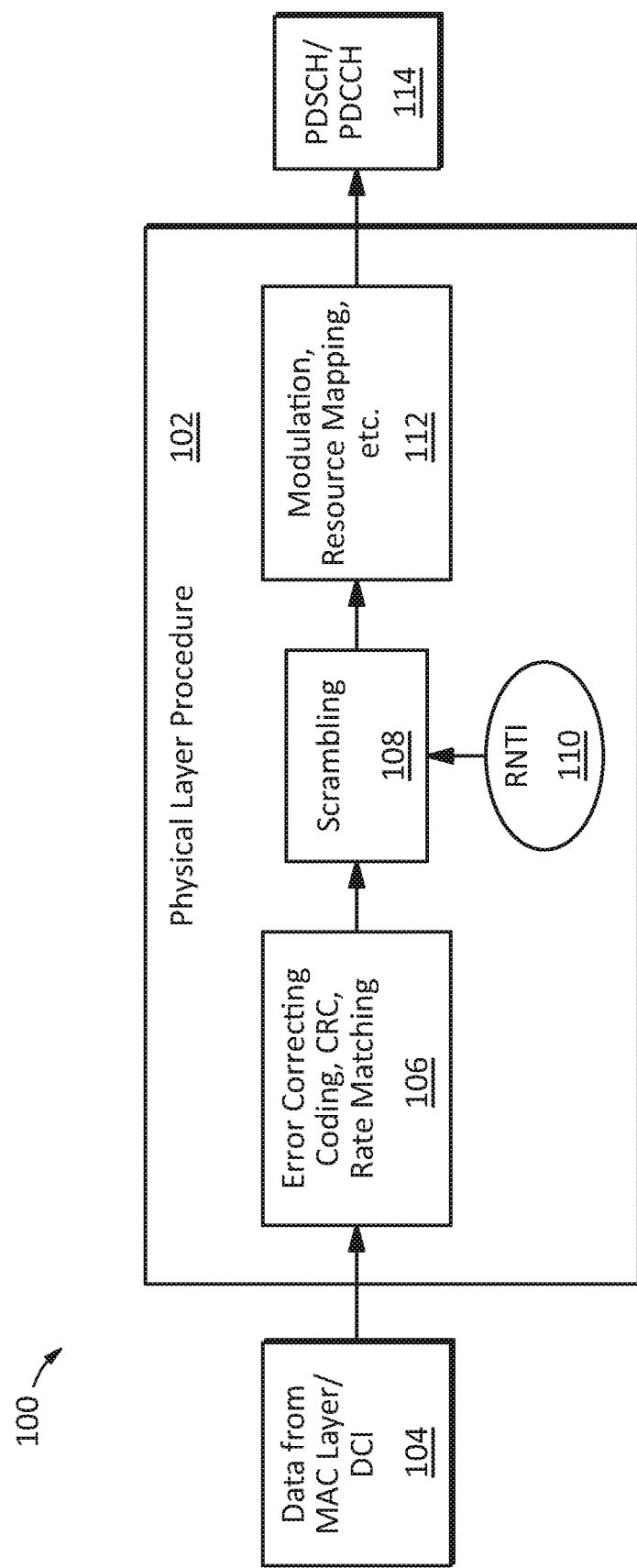
FIG. 1A illustrates an embodiment of a processing chain for one or more downlink channels in accordance with example embodiments of the disclosure.

This disclosure encompasses numerous inventive principles relating to random access in wireless systems. These principles may have independent utility and may be embodied individually, and not every embodiment may utilize every principle. Moreover, the principles may also be embodied in various combinations, some of which may amplify the benefits of the individual principles in a synergistic manner.

Some of the principles relate to sending a contention resolution message with repetitions. For example, during a random access procedure, a user equipment (UE) may send a contention resolution message to a base station and then send one or more repetitions of the contention resolution message to the base station. In some embodiments, a contention resolution message may be sent with repetitions regardless of whether the contention resolution message is part of an initial transmission or a retransmission scheduled by the base station.

Some additional principles relate to techniques for informing a base station of the capability of a UE to send a contention resolution message with repetitions. For example, in some embodiments, a UE may select a preamble from a group and/or sub-group of preambles that have been configured to indicate one or more capabilities of the UE, Sending the selected preamble to the base station may indicate the one or more capabilities of the UE to send a contention resolution message with repetitions. In some other embodiments, a UE may select a set of preamble transmission resources that have been configured to indicate one or more capabilities of the UE. Sending a preamble to the base station using the selected resources may indicate the one or more capabilities of the UE to send a contention resolution message with repetitions. In some further embodiments, a combination of preamble selection and resource selection may be used to indicate the capabilities of the UE to send a contention resolution message with repetitions.

Some additional principles relate to techniques for configuring resources for sending a contention resolution message with repetitions. For example, in some embodiments, resources for initially sending a contention resolution message may be configured independently of resources for sending repetitions of the contention resolution message. In some other embodiments, resources for initially sending a contention resolution message and resources for sending repetitions of the contention resolution message may be configured in a coupled manner (e.g., one or more of the resources may be the same or similar). In some further embodiments, resources for initial sending and repetitions of the contention resolution message may be configured in a combination of independent and coupled manners.

As a further example, in some embodiments, resources for sending a contention resolution message with repetitions may be configured dynamically (e.g., a different set of resources may be used each time a UE performs a random access procedure). In some other embodiments, resources for sending a contention resolution message with repetitions may be configured semi-statically (e.g., a single set of resources may be pre-configured via radio resource control (RRC) signaling and used by the UE for all random access procedures until the set of resources is changed via RRC signaling). In some further embodiments, a combination of dynamic and semi-static resource configuration may be used for sending a contention resolution message with repetitions.

Some additional principles relate to techniques for conveying resource allocation information from a base station to a UE for use in sending a contention resolution message with repetitions. For example, in some embodiments, a list of resources for sending a contention resolution message with repetitions may be sent from a base station to a UE. In some other embodiments, a base station may send the UE an index to an entry in a pre-configured list of resources.

Some additional principles relate to techniques for monitoring for a response from a base station. For example, in some embodiments, a UE may start a monitoring window after completing the initial sending of a contention resolution message. In some other embodiments, a UE may start a monitoring window after completing the sending of one or more repetitions of the contention resolution message.

Some additional principles relate to techniques for power adaptation while sending contention resolution messages. For example, a UE may be configured with multiple sets of power adaptation parameters to use while sending contention resolution messages. In some embodiments, one of the sets of power adaptation parameters may be selected by a base station. In some other embodiments, one of the sets of power adaptation parameters may be selected by the UE. Power adaptation parameters may be stepped across retransmissions, across repetitions of contention resolution messages, or combinations thereof.

Example Embodiments

Some example embodiments of systems, apparatus, devices, processes, methods, and/or the like illustrating some possible implementation details according to this disclosure are described herein. These examples are provided for purposes of illustrating the principles of this disclosure, but the principles are not limited to these embodiments, implementation details, and/or the like. For example, some embodiments may be described in the context of 5G and/or New Radio (NR) wireless networks, but the principles may also be applied to any other types of wireless systems including 3G, 4G and/or future generations of wireless networks, and/or any other networks with random access procedures.

Uplink and Downlink Signals

In some wireless communication systems in accordance with example embodiments of the disclosure, a UE may transmit different uplink (UL) signals to a base station. For example, in an NR system, a UE may use UL transmissions to send a variety of information to a base station which may be referred to as a gNodeB or gNB.

The UE may send user data to the gNB using a specific configuration of time and frequency resources referred to as a physical uplink shared channel (PUSCH). A multiple access (MAC) layer at the UE may provide user data that is intended to be delivered to a corresponding MAC layer at the gNB. A physical (PHY) layer at the UE may receive the user data from MAC layer as input and output one or more corresponding PUSCH signals through a PUSCH processing chain.

The UE may send control data to the gNB using a physical uplink control channel (PUCCH). The control data may be referred to as uplink control information (UCI) and may be converted to a PUCCH signal through a PUCCH processing chain.

A UE may receive different downlink (DL) signals from the gNB. For example, in an NR system, a gNB may send a variety of information to the UE using different DL transmissions.

The gNB may send user data to the UE using a specific configuration of time and frequency resources known as the physical downlink shared channel (PDSCH). A MAC layer at the gNB may provide user data that is intended to be delivered to the corresponding MAC layer at the UE. The PHY layer at the gNB may receive the user data from the MAC layer data as input and output the corresponding PDSCH signal through a PDSCH processing chain.

The gNB may send control data to the UE using a physical downlink control channel (PDCCH). The control data may be referred to as downlink control information (DCI) and may be converted into a PDCCH signal through a PDCCH processing chain.

RNTIs and Scrambling

Processing chains for signals such as PDCCH, PUCCH, PDSCH, and PUSCH in accordance with example embodiments of the disclosure may involve the use of scrambling codes. For example, in an NR system, scrambling codes may be referred to as radio network temporary identifiers (RNTIs). In some embodiments, different techniques may be used to apply RNTIs to control channels and data (shared) channels. For control channels (e.g., PDCCH and/or PUCCH), an RNTI may be used to scramble a portion of a cyclic redundancy check (CRC) code before attaching it to the payload (e.g., DCI or UCI). For PDSCH and PUSCH, however, the RNTI may be used to scramble the coded payload of the message.

FIG. 1A illustrates an embodiment of a processing chain for one or more downlink channels in accordance with example embodiments of the disclosure. The processing chain 100 illustrated in FIG. 1A may be used, for example, to implement processing chain for a PDSCH and/or a PDCCH.

The processing chain 100 may include a physical layer procedure 102 having an input processing module 106 that may receive input data 104 which may include MAC layer data for a PDSCH processing chain or DCI data for a PDCCH processing chain. The input processing module 106 may implement one or more functions such as error correcting coding, CRC, rate matching, and/or the like. The physical layer procedure 102 may further include a scrambling module 108 that may apply an RNTI 110 to an output of the input processing module 106. An output of the scrambling module 108 may be applied to an output processing module 112 that may implement one or more functions such as modulation, resource mapping, and/or the like, to generate a final output PDSCH or PDCCH 114.

Figure 1B:
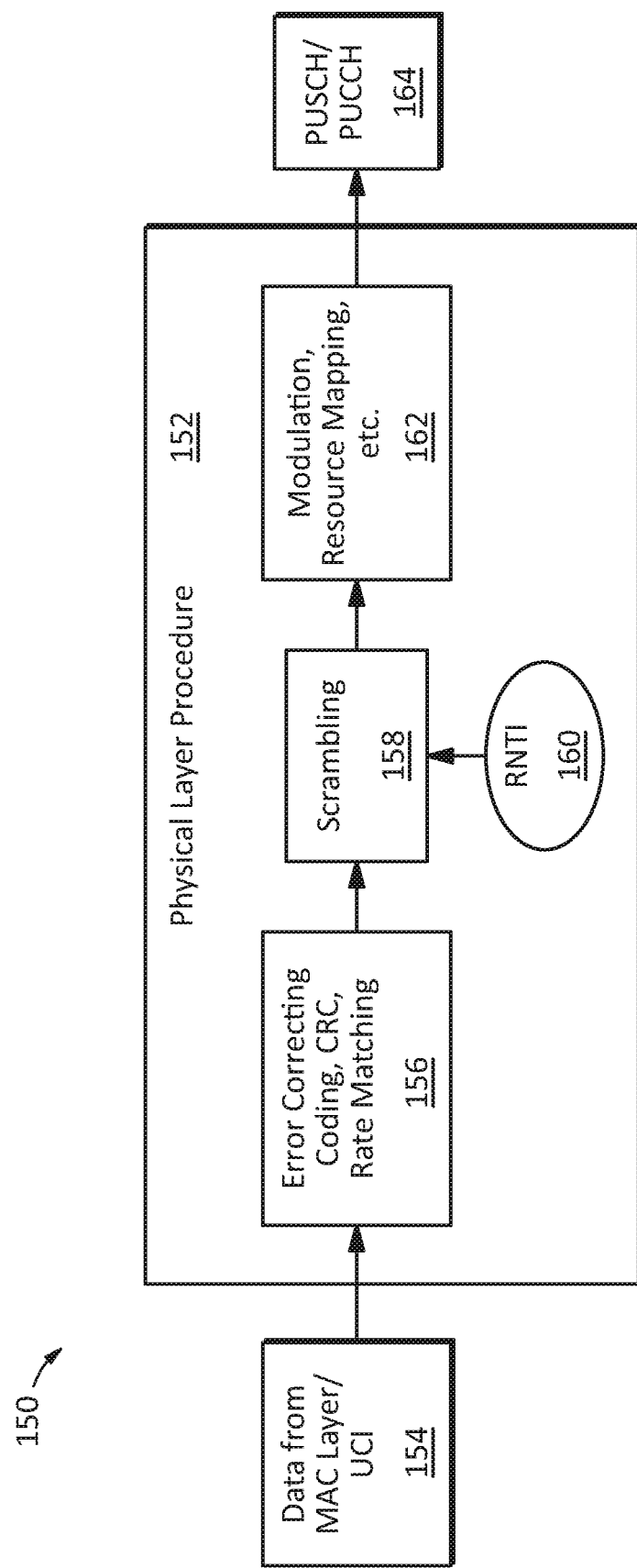
FIG. 1B illustrates an embodiment of a processing chain for one or more uplink channels in accordance with example embodiments of the disclosure.

FIG. 1B illustrates an embodiment of a processing chain for one or more uplink channels in accordance with example embodiments of the disclosure. The processing chain 150 illustrated in FIG. 1B may be used, for example, to implement processing chain for a PUSCH and/or a PUCCH.

The processing chain 150 may include a physical layer procedure 152 having an input processing module 156 that may receive input data 154 which may include MAC layer data for a PUSCH processing chain or UCI data for a PUCCH processing chain. The input processing module 156 may implement one or more functions such as error correcting coding, CRC, rate matching, and/or the like. The physical layer procedure 152 may further include a scrambling module 158 that may apply an RNTI 160 to an output of the input processing module 156. An output of the scrambling module 158 may be applied to an output processing module 162 that may implement one or more functions such as modulation, resource mapping, and/or the like, to generate a final output PUSCH or PUCCH 164.

Different types of RNTIs may be used for different procedures in an NR system in accordance with example embodiments of the disclosure. For example, a random access RNTI (RA-RNTI) may be used during a random access (RA) procedure such as a 4-step random access channel (RACH) procedure before a connection is established between a UE and a gNB. As another example, once a UE has established a connection with a gNB, it may obtain a cell RNTI (C-RNTI) which may be used for scheduling unicast PDSCHs. Some types of RNTIs such as C-RNTIs may be unique to an established connection between the gNB and one UE. However, some other types of RNTIs such as RA-RNTIs may be shared by multiple UEs (e.g., may have common values between UEs.)

Search Space and CORESET

Some UEs in an NR system in accordance with example embodiments of the disclosure may be provided with a search space set configuration and/or a control resource set (CORESET) configuration for monitoring DCI in a POOCH in a serving cell. In some embodiments, a search space set configuration may provide PDCCH monitoring occasion information in a time domain, and each monitoring occasion may be associated with a CORESET configuration linked to the search space set configuration. A CORESET configuration may provide a set of resource blocks (RBs) and/or a symbol duration for PDCCH candidate monitoring where a POOCH candidate may include a set of control channel elements (CCE) depending on an aggregation level. For example, in some embodiments, a CCE may include a six resource element group (REG), wherein each REG may include a group of 12 consecutive resource elements (RE). Thus, a UE may monitor a set of REs for POOCH candidates located in a specified time and/or frequency domain based on the CORESET and/or search space set configurations. In an NR system, different DCI formats may be used to convey different control information to the UE from the gNB. Table 1 illustrates some examples of DCI formats that may be used in accordance with example embodiments of the disclosure.

TABLE 1

| DCI Format | Usage |
| --- | --- |
| 0_0 | Scheduling of PUSCH in one cell |
| 0_1 | Scheduling of one or multiple PUSCH in one cell, or indicating downlink feedback information for configured grant PUSCH configured grant downlink feedback information (CG-DFI) |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |

TABLE 1-continued

| DCI Format | Usage |
| --- | --- |
| 1_2 | Scheduling of PDSCH in one cell |
| 2_0 | Notifying a group of UEs of the slot format, available RB sets, channel occupancy time (COT) duration and search space set group switching |
| 2_1 | Notifying a group of UEs of the PRB(s) and orthogonal frequency-division multiplexing (OFDM) symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources |
| 2_6 | Notifying the power saving information outside discontinuous reception (DRX) Active Time for one or more UEs |
| 3_0 | Scheduling of NR sidelink in one cell |
| 3_1 | Scheduling of long term evolution (LTE) sidelink in one cell |

Timing Adjustment

In an NR system in accordance with example embodiments of the disclosure, communications between a UE and a gNB may be frame-based. During an initial access, UL transmissions from a UE may not be time-aligned with the gNB frame timing due to a roundtrip delay time that may not be unaccounted for. In some embodiments, to synchronize the frame timing of the UE and the gNB (e.g., for UL and/or DL transmissions), a physical random access channel (PRACH) may be transmitted from the UE to the gNB. The gNB may use the PRACH signal to estimate the roundtrip delay time. Based on the roundtrip delay time, the gNB may then inform the UE of a value of a timing adjustment (TA) the UE may apply to one or more UL transmissions to properly align the frame timing. Thus, during an initial access procedure, a UE may send a PRACH signal in addition to obtaining system information from the gNB as explained in more detail below.

Random Access Procedure

Figure 2:
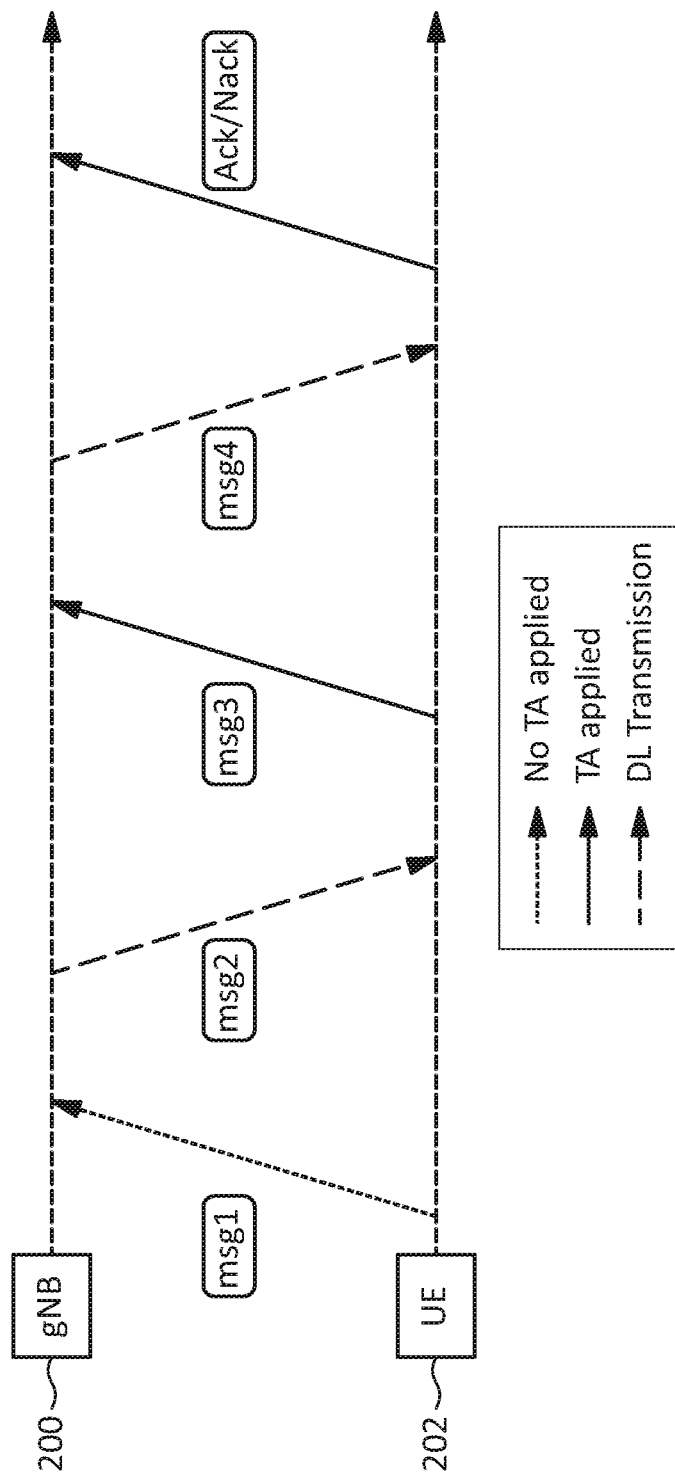
FIG. 2 illustrates an example embodiment of a 4-step random access (RA) procedure for an NR wireless network in accordance with the disclosure.

FIG. 2 illustrates an example embodiment of a 4-step random access (RA) procedure for an NR wireless network in accordance with the disclosure. Prior to the start of an RA procedure, a base station 200, which in this embodiment may be implemented as a gNB, may broadcast a master information block (MIB) and one or more system information blocks (SIBS) to any UEs within range such as UE 202. The MIB/SIB transmission(s) may include fundamental system information that a UE may use to communicate over the wireless network including information about the configuration of the RA procedure.

A random access message exchange may be initiated by the UE 202 when it sends a first message (msg1) including a random access preamble selected from a pool of preambles to the gNB 200 over the PRACH which may be configured by the system information in the MIB/SIB. An identifier (ID) of the preamble chosen by the UE may be referred to as an RAPID. At this point, multiple UEs may potentially have initiated 4-step RA processes simultaneously. In some embodiments, each UE may use a preamble with a different RAPID.

After receiving msg1, the gNB 200 may send a second message (msg2) to the UE which may include a random access response (RAR). In some embodiments, msg2 may include the RAPID of the preamble chosen by one UE (or in case of contention, multiple UEs), along with a TA value for the UE with the corresponding RAPID and a temporary C radio network temporary identifier (TC-RNTI) which may be used by the UE 202 for the rest of the RA procedure. Msg2 may also include a grant of UL resources such as PUSCH time/frequency resources, modulation and coding scheme (MCS), transmission control protocol (TOP), and/or the like, the UE may use to send a contention resolution message (msg3) to the gNB.

After receiving msg2, the UE 202 may use the value of TA to adjust its uplink timing. The UE 202 may then send msg3 to the gNB 200 using the PUSCH resources allocated by the uplink grant received in msg2. In some embodiments, msg3 may include contention resolution ID (CRID) that may be provided by one or more higher layers above the physical layer of the UE. If multiple UEs have the same RAPID, all UEs may send msg3 containing different CRIDs.

After receiving msg3, the gNB 200 may respond by sending a fourth message (msg4) which may include the CRID of one UE (e.g., UE 202). The UE that has the corresponding CRID may then proceed to send an acknowledgement (ACK) message acknowledging the successful reception of msg4 and the initial access procedure. The temporary identifier TC-RNTI may then be promoted to a dedicated UE identifier C-RNTI.

Preamble Grouping

In some NR systems in accordance with example embodiments of the disclosure, a collection of groups of non-intersecting preambles may be configured (e.g., by a gNB) within a cell. For example, two groups of preambles, Group A and Group B, may be pre-configured by the network to indicate different sizes of msg3 the UE 202 may transmit using the PUSCH. The groups of preambles may additionally, or alternatively, indicate information about the pathloss level between the UE and gNB.

When selecting a preamble to send with msg1, the UE may first select one of the groups of preambles. The UE may then select a preamble from within the selected group. For example, the UE 202 may select and transmit a preamble from Group A if msg3 will be below a certain pre-determined size, but may otherwise select and transmit a preamble from Group B. Additionally, or alternatively, the UE 202 may select and transmit a preamble from Group A if the pathloss between the UE and gNB is below a pre-configured threshold, but may otherwise select and transmit a preamble from Group B.

Monitoring Responses from Base Station

During a random access procedure in accordance with example embodiments of the disclosure, after the UE sends an initial message or contention resolution message (e.g., msg1 or msg3), the UE may begin to monitor for the expected reply (e.g., msg2 or msg4) from the gNB. For example, after the last symbol of msg1 or msg3 is transmitted, the UE may start a monitoring timer (which may establish a monitoring window) at the first following symbol of a CORESET where msg3 (msg4) scheduling DCI may be expected to be received. The monitoring window duration may be RRC configured, for example, at the UE. If a retransmission is needed, the UE may receive a DCI 0_0 during the window scheduling a retransmission of msg3. In some embodiments, the monitoring window may be restarted after each retransmission.

If msg3 is not received correctly by the gNB, the gNB may request a retransmission of msg3 by the UE. A retransmission of msg3 may be scheduled, for example, by sending DCI format 0_0 from the gNB to the UE. In some embodiments, a msg3 retransmission may be performed with a symbol allocation identical to that used for the original msg3 transmission. However, the scheduling DCI may specify the same or a different redundancy version (RV) to be used with the retransmission.

Power Adaptation

In some NR systems in accordance with example embodiments of the disclosure, the transmission power $P_{PUSCH}$ of the i-th retransmission of msg3 may be expressed as $$P_{PUSCH}(i) = \min\{P_{CMAX}(i), P_{O_{RE}} + \Delta_{PREAMBLE_{Msg3}} + 10 \log_{10}(2^\mu \cdot M(i)) + \alpha \cdot PL + \Delta_{TF} + f\} \quad \text{Eq. 1}$$

where $P_{CMAX}(i)$ may be the maximum transmission power allowed, $P_{O_{PRE}}$ may be the preamble received target power configured by the RRC parameter preambleReceivedTargetPower, $\Delta_{PREAMBLE_{Msg3}}$ may be an adjustment factor determined by the RRC parameter msg3-DeltaPreamble, M(i) may be the number of allocated resource elements, PL may be the measured path loss, $\alpha$ may be the pathloss compensation factor configured by the parameter msg3-Alpha, $\Delta_{TF}$ may be the transport factor used for MCS adjustment, and $f$ may be the closed loop power control factor. Moreover, the factor $f$ may include a transmit power control (TPC) command $\delta_{msg2}$ and a power ramping factor provided by one or more higher layers for the i-th transmission.

In some embodiments, the power ramping factor $P_{msg3}^{ramp}$ for msg3 may be expressed as $$P_{msg3}^{ramp}(i) = C_{msg3}(i) * \text{step}_{msg3} \quad \text{Eq. 2}$$

where $C_{msg3}(i)$ may be the ramping counter of msg3 at retransmission i, and $\text{step}_{msg3}$ may be the power ramping step for msg3, configured by the parameter powerRampingStep.

Thus, in some embodiments, one or more of the following parameters may be used to specify a power adaptation procedure for a msg3 transmission: preambleReceivedTargetPower, msg3-DeltaPreambie, msg3-Alpha, and/or powerRampingStep.

Scheduling and HARQ

In some NR systems in accordance with example embodiments of the disclosure, a gNB may dynamically schedule a PDSCH to one or more UEs through the use of one or more DCIS conveyed via a PDCCH. In some embodiments, an NR system may implement a closed-loop feedback transmission technique which may be referred to as hybrid automatic repeat request (HARQ).

To apply HARQ to a downlink, an embodiment of a procedure for scheduling a PDSCH with feedback may be implemented as follows.

A gNB may transmit a PDCCH with DCI information that schedules resources for receiving a PDSCH. The PDCCH may be transmitted using one set of time/frequency resources chosen from a CORESET that may include multiple sets that may be continuously monitored by the UE. The PDCCH may be scrambled with a particular RNTI value.

Upon decoding the DCI, the UE may attempt to decode the corresponding PDSCH in the indicated resources. The PDSCH may be scrambled with the same RNTI value used for the corresponding PDCCH.

In certain situations (for example, when the PDSCH is associated with a HARQ process), the gNB may indicate to the UE to send feedback in response to receiving the scheduled PDSCH. The feedback may include sending one or more UL signals as an Acknowledgement (ACK) or a Negative ACK (NACK) in response to the successful or failed decoding of PDSCH, respectively. In some embodiments of an NR system, the feedback may be part of a HARQ process. In these situations, the gNB may indicate to the UE the resources to use for sending the HARQ ACK and/or NACK via the scheduling DCI (e.g., for unicast PDSCHs scrambled with C-RNTI). In other situations, the UE may be indicated with the resources to use for sending HARQ feedback in the PDSCH payload (e.g., for receiving PDSCH corresponding to msgB in 2-step RACH).

To apply HARQ to an uplink, a gNB may use DCIS to dynamically schedule PUSCH to be transmitted by one or more UEs. An embodiment of a procedure for scheduling a PUSCH with feedback may be implemented as follows.

A gNB may transmit a PDCCH with DCI information that schedules resources for transmitting a PUSCH. The PDCCH may be transmitted using one of the CORESETs that may be continuously monitored by the UE. The PDCCH may be scrambled with a particular RNTI value.

Upon decoding the DCI, the UE may prepare the PUSCH for an attempted transmission using the indicated resources. The PUSCH may be scrambled with the same RNTI value used for the corresponding PDCCH.

In certain situations (for example, when the PUSCH is associated with a HARQ process), a UE may be expected to receive feedback from the gNB in response to receiving the scheduled PUSCH. The feedback may include sending one or more DL signals as an ACK or NACK in response to the successful or failed decoding of the PUSCH, respectively. In these situations, the UE may be indicated with the resources to be used for receiving the HARQ ACK and/or NACK via the scheduling DCI (e.g., for unicast PUSCHs scrambled with C-RNTI). In other situations, the UE may be indicated with the resources for receiving HARQ feedback in the payload of a previously received PDSCH (e.g., in the case of msg3 transmission in 4-step RACH, where the resources for receiving HARQ feedback from the gNB may be provided in the UL grant an msg2).

Scheduling Timeline

In some NR systems in accordance with example embodiments of the disclosure, resources may be scheduled from the gNB to the UE through techniques involving relative time offsets.

Figure 3A:
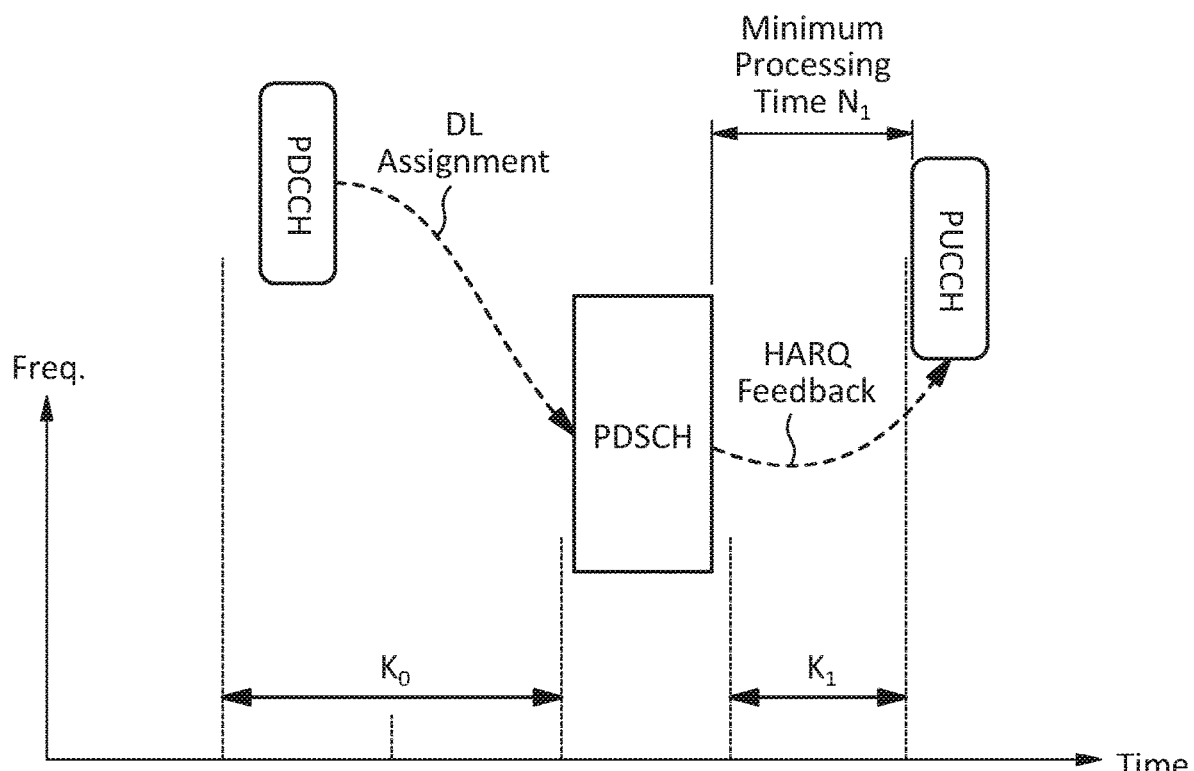
FIG. 3A illustrates an example embodiment of HARQ downlink scheduling in accordance with example embodiments of the disclosure.
Figure 3B:
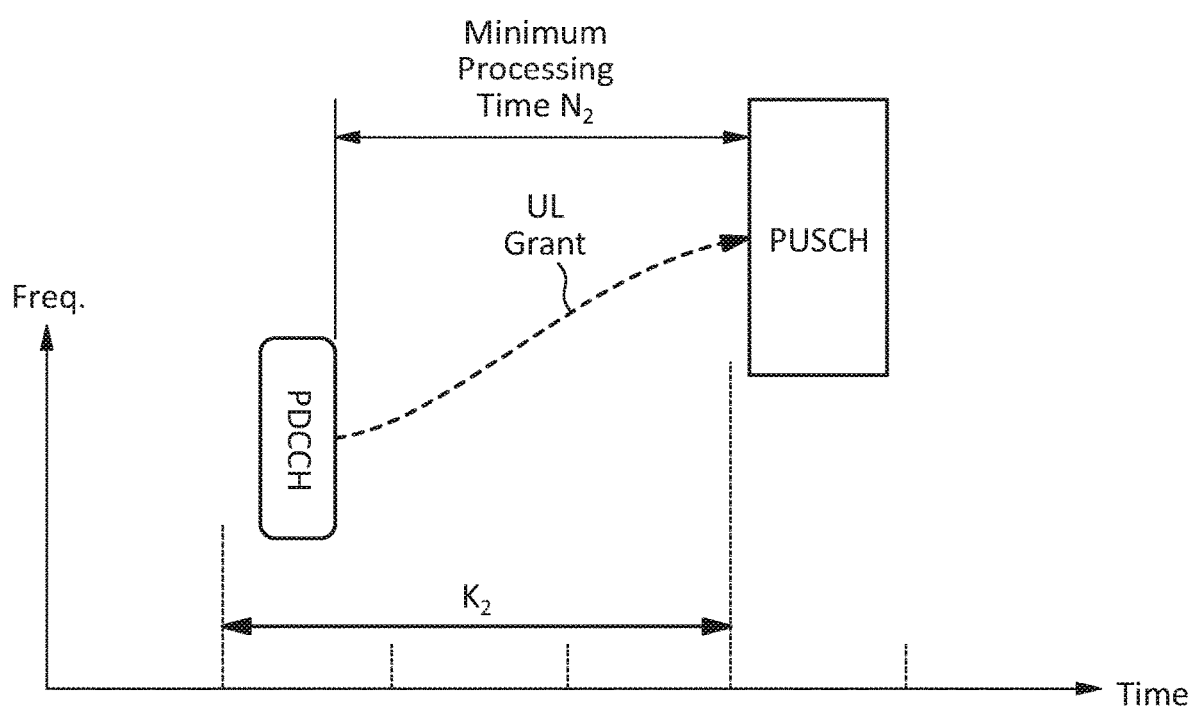

FIG. 3A illustrates an example embodiment of HARQ downlink scheduling in accordance with example embodiments of the disclosure. FIG. 3B illustrates an example embodiment of HARQ uplink scheduling in accordance with example embodiments of the disclosure.

In some embodiments, a gNB may use a PDCCH to provide a DL assignment to a PDSCH to indicate to a UE a relative slot offset from the slot containing the PDCCH to the slot containing the resources for the PDSCH. This slot offset may be referred to as $K_0$ as illustrated in FIG. 3A. Similarly, a time offset may be indicated to determine a slot for HARQ feedback relative to the slot containing the PDSCH. This slot offset may be referred to as $K_1$ as illustrated in FIG. 3A. The gNB may also indicate resources for UL grants in UL scheduling by indicating a time offset from the slot containing the scheduling PDCCH to the slot containing the PUSCH resources. This offset may be referred to as $K_2$ as illustrated in FIG. 3B.

In some embodiments, when performing one or more tasks relating to scheduling transmissions for UEs, a gNB may adhere to one or more constraints pertaining to the relative timings of UL and DL transmissions with respect to UE processing capabilities. For example, when a gNB schedules a DL transmission of a PDSCH, the gNB may attempt to ensure enough time for the UE to process the scheduling DCI and/or perform the reception and/or decoding of the transmitted PDSCH. A process of accommodating one or more timing constraints may be referred to as adhering to a timeline. In some embodiments, a timeline for a UE may include (1) enough time to receive, decode, and/or process the scheduling DCI, and/or (2) the time consumed by the UE to switch from transmission to reception, which may be referred to as UE switching time. For example, UE switching time may be accounted for in Time-Division-Duplex (TDD) systems. In cases in which a UE may be scheduled to transmit a corresponding HARQ ACK feedback, then the timeline can also include (1) the time consumed by the UE to receive, decode, and/or process the scheduled PDSCH, and/or (2) the time required to prepare the corresponding HARQ feedback. Similar timing constraints may be implemented for scheduling PUSCHs.

Some embodiments may specify different processing timing requirements for UEs with different capabilities. For example, these requirements may include (1) a minimum amount of time to allow for processing a PDSCH, which may be referred to as $N_1$, (2) a minimum amount of time to allow for preparing and transmitting a PUSCH, which may be referred to as $N_2$, and/or (3) an amount of time that accounts for switching between UL and DL in TDD systems. In some embodiments, the values of such times may depend on the processing capabilities of the UE. For example, UEs with basic capabilities may have larger processing time constraints, whereas UEs with higher capabilities may have smaller processing time constraints. In some embodiments, when a UE establishes an RRC connection, it may inform the gNB of its UE capabilities which may then be taken into consideration by the gNB when performing scheduling tasks.

HARQ and Redundancy Version

In some NR systems in accordance with example embodiments of the disclosure, messages (e.g., PDSCHs and/or PUSCHs) associated with HARQ processes may be encoded as follows. The PDSCH (or PUSCH) may first be coded with a base code with a mother coding rate. The codeword may then be punctured to achieve a target code rate indicated for the scheduled PDSCH (or PUSCH). In some embodiments, the puncturing pattern may be determined based on an RV. For example, an RV index may specify the start and length of a sequence of parity bits retained in a particular PDSCH (or PUSCH) transmission. In some embodiments, there may be, for example, four RV indices.

Figure 4:
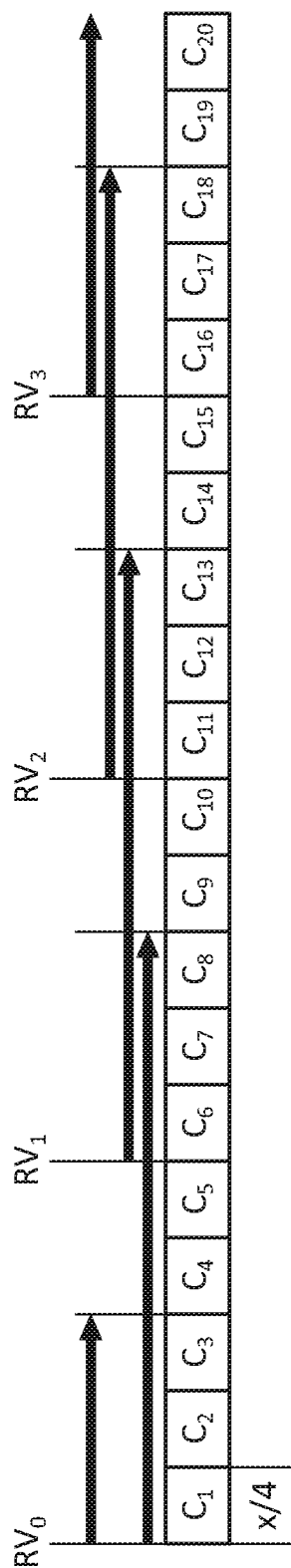
FIG. 4 illustrates an embodiment of a redundancy version scheme in accordance with example embodiments of the disclosure.

FIG. 4 illustrates an embodiment of a redundancy version scheme in accordance with example embodiments of the disclosure. The embodiment illustrated in FIG. 4 includes four RV indices (0, 1, 2, and 3), a codeword with a mother code of ⅕, and a target code rate of ½. In the embodiment illustrated in FIG. 4, the transport block (TB) may have a length of x bits. The codeword sections shown as $C_1$, $C_2$, . . . may include any number of bits. Retransmitted signals may use different RV indices when retransmissions are scheduled. This may allow the receiver to perform soft combining in which some or all retransmissions of the TB may be combined, for example, to enhance the decoding performance of the receiver.

Scheduling Retransmissions

In some NR systems in accordance with example embodiments of the disclosure, retransmissions may be scheduled dynamically and/or using preconfigurations. As an example of dynamic rescheduling of DL transmissions, if a PDSCH associated with a HARQ process has not been successfully decoded, the UE may send a NACK feedback signal to the gNB. Upon receiving the NACK feedback, the gNB may reschedule a PDSCH transmission to the UE via a new DCI indication to the UE. The new DCI may indicate that the scheduled PDSCH is not a new packet, for example by not toggling a new data indicator (NDI) field in the DCI. The DCI may also indicate the HARQ process with which the scheduled PDSCH is associated, and/or the assumed RV index.

In some embodiments, similar behavior may be implemented for UL transmissions. For example, if a PUSCH associated with a HARQ process has not been successfully decoded, the gNB may schedule a retransmission of the PUSCH. (In the case of a UL transmission, the gNB may not need to send an explicit HARQ NACK feedback because it may simply schedule a retransmission), The rescheduling of the PUSCH may be performed, for example, by transmitting a scheduling DCI with the NDI indicator not toggled, and with an indication of the associated HARQ process and assumed RV index.

Alternatively, or additionally, some embodiments may allow automatic repetitions of a transmission which may be scheduled along with the original transmission. In some embodiments, repetition of a transmission may be referred to as aggregation. For example, in some embodiments, a gNB may schedule a set of K transmissions of a PDSCH in a set of K consecutive slots, each with identical symbol allocations. These scheduled PDSCHs may include one first PDSCH containing a new payload, and K−1 repetitions of the first PDSCH. All transmissions may belong to the same HARQ process, and each transmission may assume a particular RV index. The sequence of RV indices assumed in all transmissions may be agreed upon between the gNB and the UE such that both the transmitter and receiver are in agreement on the RV index assumed in each slot. The number of repetitions K of a PDSCH may be referred to as an aggregation factor.

In some embodiments, the aggregation factor may be indicated dynamically, in which case the scheduling DCI may include a time resource allocation indication. The resource allocation indication may include an index to a time resource allocation table that may be RRC configured on the UE side. The time resource allocation table may include an entry for the number of repetitions which may configure the number of repetitions K.

Alternatively, or additionally, the aggregation factor may be indicated statically, in which case a UE may be RRC configured with an aggregation factor parameter that may specify the number of repetitions K that may be employed for one or more PDSCHs scheduled with repetitions. In this case, the gNB may be unable, or only partially able, to dynamically indicate how many repetitions may be used in each scheduling of a PDSCH with repetitions.

UE Capabilities

In some NR systems in accordance with example embodiments of the disclosure, a gNB and/or UE may have the ability to implement carrier aggregation (CA). In a CA scheme, a UE may be able to use multiple component carriers (CCs) for transmission, allowing the UE to utilize a larger bandwidth than would be possible using a single CC, Some embodiments may implement one or more of the following CA modes: intra-band frequency aggregation with contiguous CCs, intra-band frequency aggregation with non-contiguous CCs, and/or inter-band frequency aggregation with non-contiguous CCs.

In some embodiments, the categorization of CA modes may depend on the collection of bands that may include the CCs that may be used for CA. This collection of bands may be referred to as a band combination. In some embodiments of NR systems, CA may be applied across cells. For example, a UE may initially connect to one cell in the CA, which may be referred to as the primary cell (PCell). The UE may then find and connect to one or more other cells in the CA which may be referred to as secondary cells (SCells). The UE in CA may be able to use each cell for transmission and/or reception of different combinations of signals. For example, a UE may be able to send and/or receive a PUSCH on one cell and send and/or receive a sounding reference signal (SRS) on another cell.

Some embodiments may specify one or more timeline rules and/or conditions for such simultaneous transmission and/or reception of signals in CA. In addition, even with timeline rules and/or requirements, some embodiments may not mandate that every NR-connected UE be able to perform such simultaneous usage of CCs in CA, Moreover, a UE may have the capability of performing certain transmission and/or reception tasks in CA while not having the capability of performing other tasks. Another factor that may affect the UE capability may be the use of FDD and/or TDD. For example, a UE may be able (or unable) to perform a task using FDD bands and/or band combinations, while it may be unable (or able) to perform the same task using TDD bands and/or band combinations. In some embodiments, to better utilize the capabilities of a UE and improve or optimize the use of the network, the gNB may be informed of the capabilities of a UE which it may then take into account when the gNB schedules transmissions to and/or receptions from UEs in the network.

In some embodiments, a UE capability may refer to a mechanism that may be used to inform a gNB of the ability of a UE to perform certain transmission and/or reception tasks. Each UE capability reported to the gNB may inform the gNB of the UE's ability to perform a particular task. A UE capability mechanism may provide a UE with flexibility to report its capability in different transmission scenarios. The following are some examples of possible techniques for reporting UE capabilities to a gNB. Other techniques may also be used.

A UE may report its capability to perform certain tasks in any scenario. This may be referred to as a UE reporting a capability on a per-UE basis.

A UE may report its capability to perform certain tasks in particular bands. This may be referred to as a UE reporting a capability on a per-band basis.

A UE may report its capability to perform certain tasks in particular band combinations in CA. This may be referred to as a UE reporting a capability on a per-bandCombination or per-BC basis.

A UE may report its capability to perform certain tasks in CA in certain situations, e.g., not necessarily always for a given band combination. In this case, a mechanism which may be referred to as feature sets may be used to allow for such flexibility in reporting, and this may be referred to as a UE reporting a capability on a per-featureSet or per-FS basis.

In some example embodiments, a UE capability may inform a gNB that a UE is able (or not able) to transmit certain UL signals in certain bands. The UE capability mechanism may have the flexibility to indicate that the UE may be able to perform a certain task in certain scenarios, while it may be unable to perform the same task in other scenarios. For example, certain UE capabilities may be signaled to the gNB on a per-band basis, e.g., for one task, the UE may have different capabilities for different bands. Some UE capabilities may be universal across bands and/or band combinations, thus, they may be per-UE based. In the case of CA, UE capabilities may be signaled on a per-band-combination basis. Thus, with respect to CA, the ability of a UE to perform certain tasks may depend on the combination of bands involved in the CA.

Sending Contention Resolution Message with Repetitions

In some wireless networks in accordance with example embodiments of the disclosure, a UE may be allowed to send a contention resolution message to a base station with repetitions. For example, during a random access procedure in an NR system, a UE may send msg3 to a gNB with repetitions using a PUSCH.

In some embodiments, a UE may send a contention resolution message with repetitions regardless of the context. For example, during a random access procedure in an NR system, a UE may send msg3 with repetitions during a first attempted transmission of msg3, or during a retransmission of msg3. Moreover, although some embodiments may be described in the context of systems in which a base station may perform scheduling of a contention resolution message with repetitions, the inventive principles are not limited to any particular type of scheduling. For example, in some embodiments, scheduling of a contention resolution message with repetitions may be performed by one or more UEs, or by any other component, process, and/or the like. As another example, a UE may send a contention resolution message with repetitions during a 2-step RA procedure, a 4-step RA procedure, and/or the like.

In some embodiments, sending a contention resolution message with repetitions may refer to sending any number of repetitions of an initial contention resolution message including zero, one, etc. In some embodiments sending a contention resolution message with repetitions may refer to the UE being allowed to send one or more repetitions, regardless of whether any repetitions of the initial contention resolution message are ever sent. In some embodiments, a repetition of a contention resolution message may also refer to an initial contention resolution message; thus, for example, sending an initial contention resolution message with two repetitions may also be referred to as sending three repetitions of the contention resolution message. As another example, sending K of the same contention resolution message may be referred to as sending K repetitions of the contention resolution message.

Although the inventive principles relating to sending a contention resolution message with repetitions are not limited to any particular context, in some embodiments, they may be especially beneficial for implementing coverage enhancement (CE). For example, in a CE scenario, due to poor channel quality, there may be a relatively high likelihood that the gNB may fail to decode a msg3 transmission from a UE. Thus, the gNB may reschedule multiple retransmissions of msg3 which may become a bottleneck.

In some embodiments, allowing a UE to send a contention resolution message with repetitions may enable a system to avoid unnecessary scheduling of retransmissions. Moreover, depending on the implementation details, allowing a contention resolution message to be sent with repetitions may also reduce latency, especially, for example, in CE scenarios in NR where retransmissions of msg3 are likely to be required by the gNB.

Figure 5A:
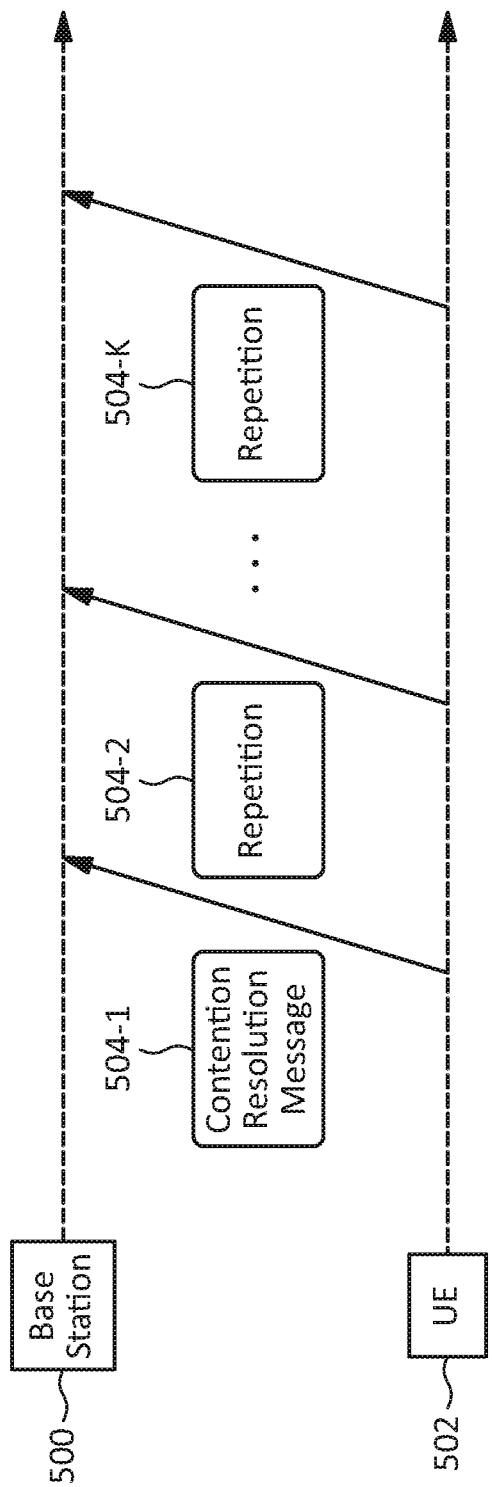
FIG. 5A illustrates an embodiment of a random access procedure in which a UE may send a contention resolution message with repetitions in accordance with example embodiments of the disclosure.

FIG. 5A illustrates an embodiment of a random access procedure in which a UE may send a contention resolution message with repetitions in accordance with example embodiments of the disclosure. In the embodiment illustrated in FIG. 5A, a UE 502 may send an initial contention resolution message 504-1 to a base station 500. The UE 502 may be allowed to send one or more repetitions of the contention resolution message 504-2 . . . 504-K to the base station 500, Depending on a monitoring technique that may be implemented to enable the UE 502 to determine if the base station 500 has successfully decoded the initial contention resolution message 504-1, the UE 502 may send any number from zero through K of the repetitions of the contention resolution message 504-2 . . . 504-K.

Figure 5B:
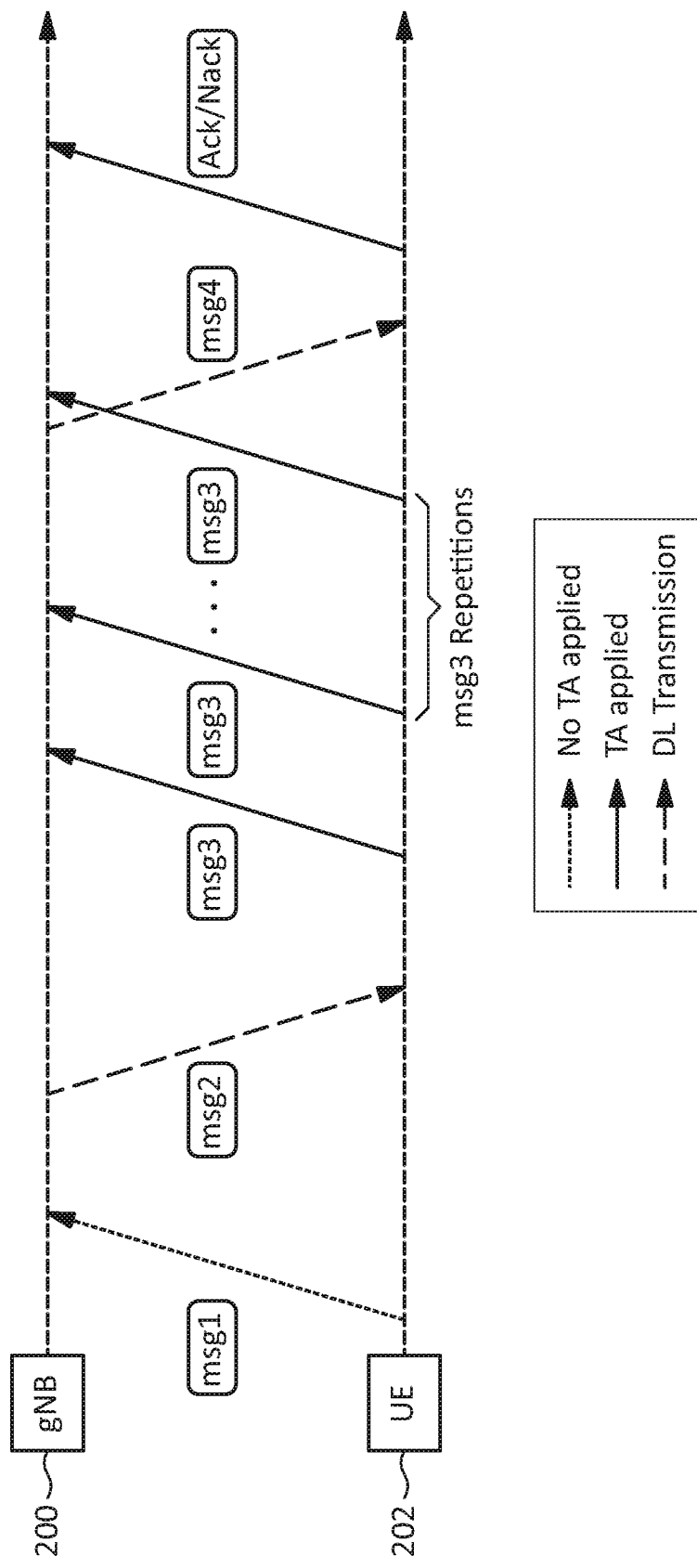
FIG. 5B illustrates an example embodiment of a 4-step random access (RA) procedure for an NR wireless network with contention resolution message repetition in accordance with the disclosure.

FIG. 5B illustrates an example embodiment of a 4-step random access (RA) procedure for an NR wireless network with contention resolution message repetition in accordance with the disclosure. The embodiment illustrated in FIG. 5B may be similar to the embodiment illustrated in FIG. 2, however, in the embodiment illustrated in FIG. 58, msg3 may be sent with one or more repetitions.

In some embodiments, the UE 502 may send one or more of the messages 504-1 . . . 504-K again, for example, if the base station 500 schedules a retransmission of the initial contention resolution message with repetitions.

In some NR systems in accordance with example embodiments of the disclosure, a gNB may schedule a msg3 transmission with repetitions dynamically, for example, using a scheduling DCI.

Figure 6:
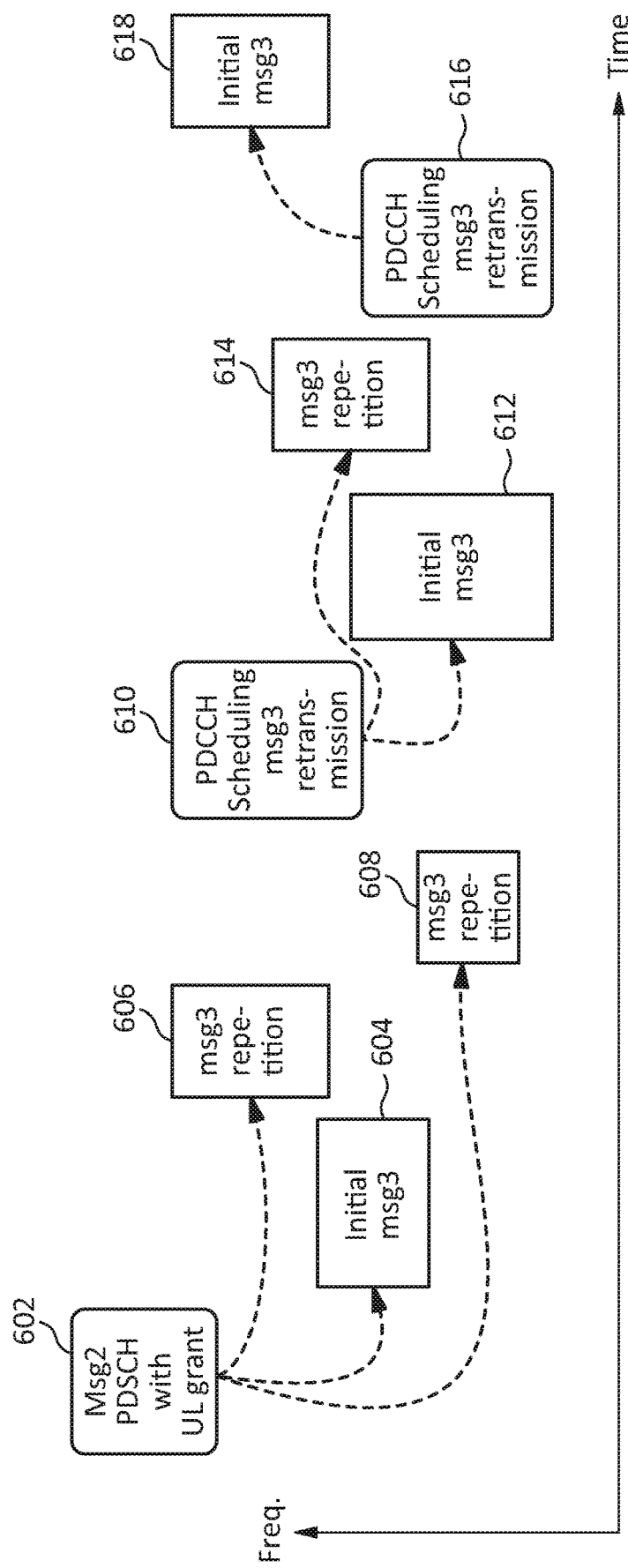
FIG. 6 illustrates some embodiments of msg3 transmissions with repetitions in an NR system in accordance with example embodiments of the disclosure.

FIG. 6 illustrates some embodiments of msg3 transmissions with repetitions in an NR system in accordance with example embodiments of the disclosure. In the embodiments illustrated in FIG. 6, time may be represented on the horizontal axis, and frequency may be represented on the vertical axis.

A gNB may schedule a first transmission of a msg3 with repetitions from a UE. The gNB may send a msg2 602 to the UE using a PDSCH and including a UL grant with resources such as PUSCH time/frequency resources, MCS, TCP, RV index, and/or the like to be used by the UE to send msg3 and one or more repetitions which, in this example, may include an initial msg3 604, a first repetition of msg3 606, and a second repetition of msg3 608. (As mentioned above, the three instances 604, 606, and 608 of msg3 may alternatively be referred to as three repetitions of msg3.)

If the gNB fails to decode any of the instances 604, 606, and 608 of msg3, it may dynamically reschedule a retransmission of msg3 by sending a PDCCH 610. The UE may respond to the PDCCH 610 by sending msg3 612 and a repetition of msg3 614.

If the gNB again fails to decode any of the instances 612 and 614 of msg3, it may dynamically reschedule another retransmission of msg3 by sending a PDCCH 616. The UE may respond to the PDCCH 616 by sending msg3 618.

In some embodiments, during a 4-step RACH, the gNB may not be aware of the capability of a UE to implement msg3 with repetitions. Even if a UE performs a 4-step RACH while RRC connected, the UE may not indicate its C-RNTI to the gNB until the msg3 transmission. Thus, msg3 scheduling may occur while the gNB is not aware of the UE's capability to send msg3 with repetitions.

In accordance with example embodiments of the disclosure, in addition to applying one or more contention resolution message (e.g., msg3) enhancements to a UE, some additional principles relate to one or more techniques for indicating an enhanced capability of a UE such as the ability to send contention resolution message with repetitions. In some embodiments, the introduction of UE capabilities, and indication of such capabilities, regarding contention resolution message enhancement may enable backward compatibility with UEs that do not have one or more such capabilities. However, in some embodiments, one or more of the techniques relating to CE (e.g., sending a contention resolution message with repetitions) may be readily applicable even if such UE indication is not present.

Preamble Grouping to Indicate UE Capabilities

In some wireless networks in accordance with example embodiments of the disclosure, one or more dedicated sets of preambles may be used to enable a UE to indicate a UE capability to a base station. For example, in an NR system, a gNB may configure a preamble grouping per cell. The grouping may be indicted to UEs in the cell, for example, in the SIB.

Figure 7:
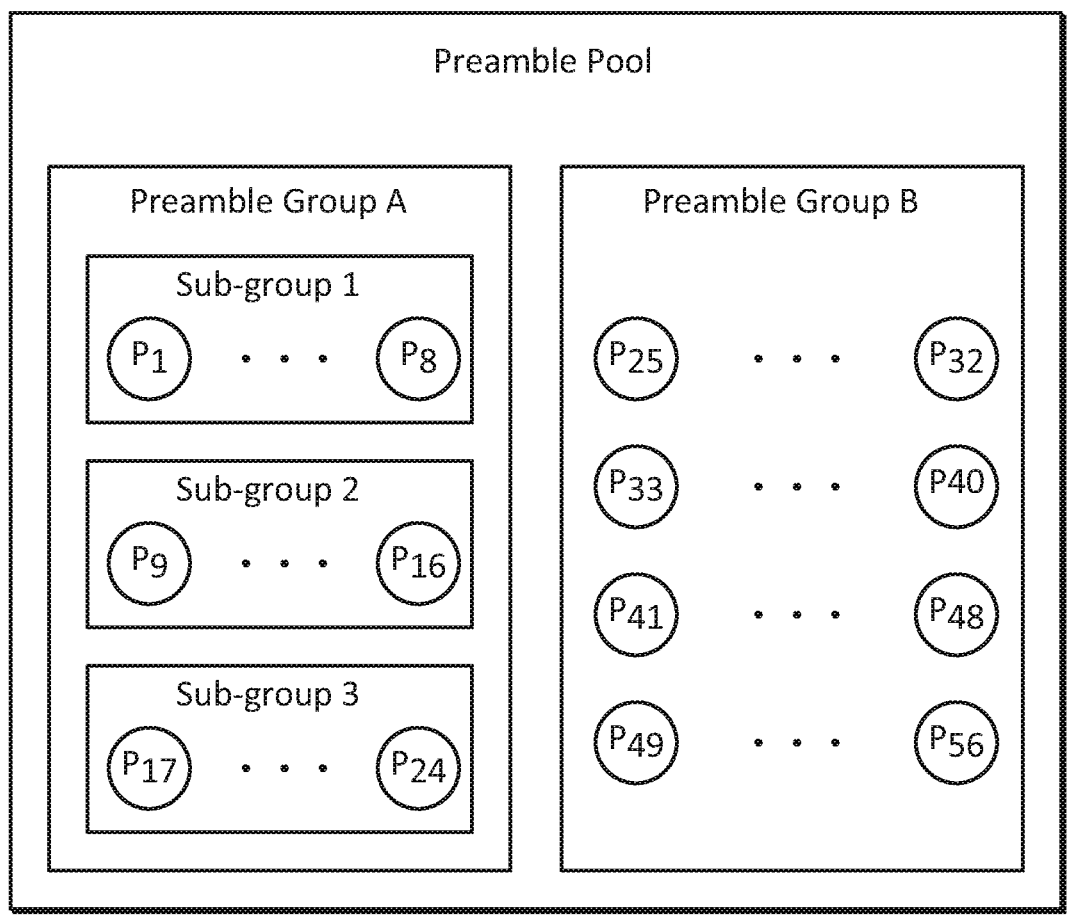
FIG. 7 illustrates an example of a preamble pool grouping to indicate a UE capability such as the ability to send a contention resolution message with repetitions in accordance with example embodiments of the disclosure.

FIG. 7 illustrates an example of a preamble pool grouping to indicate a UE capability such as the ability to send a contention resolution message with repetitions in accordance with example embodiments of the disclosure. The embodiment illustrated in FIG. 7 may be described in the context of an NR system, but the principles may be applied to any other wireless network with RA procedures.

A first group of the preambles (e.g., group A) may be selected for use by a UE to indicate a CE capability such as sending a contention resolution message with repetitions, while a second group of preambles (e.g., group B) may be selected for use by the UE to indicate a lack of a CE capability. In some embodiments, the ratio of the sizes of the preamble groups may be determined based, for example, on the expected number of UEs that may have CE capabilities to report, and the expected number of UEs that may not have CE capabilities to report.

In the embodiment illustrated in FIG. 7, preamble group A may be further split into sub-groups (e.g., sub-group 1, sub-group 2, etc.) which may indicate different UE capabilities. In the embodiment illustrated in FIG. 7, preamble group A may be split into sub-groups (e.g., to indicate a UE capability for sending msg3 with repetitions) because group A may be more likely to be used in CE scenarios due to poor channel conditions, (For example, preambles in group A may be used if the pathloss between the UE and gNB is below a pre-configured threshold.) In other embodiments, however, preambles in groups A and B, or only group B, may be split into sub-groups (e.g., to indicate a UE capability such as sending msg3 with repetitions).

Resource Selection to Indicate UE Capabilities

In some wireless networks in accordance with example embodiments of the disclosure, one or more separate sets of resources for preamble transmission may be used to enable a UE to indicate a UE capability to a base station. For example, in an NR system, a gNB may configure separate sets (e.g., nonoverlapping sets) of RACH occasion (RO) resources corresponding to different CE capabilities of a UE. A UE may then select and use one of the sets of resources for preamble transmission, for example, during a 4-step RACH procedure, to indicate its CE capabilities (e.g., ability to send msg3 with repetitions) to the gNB.

Figure 8:
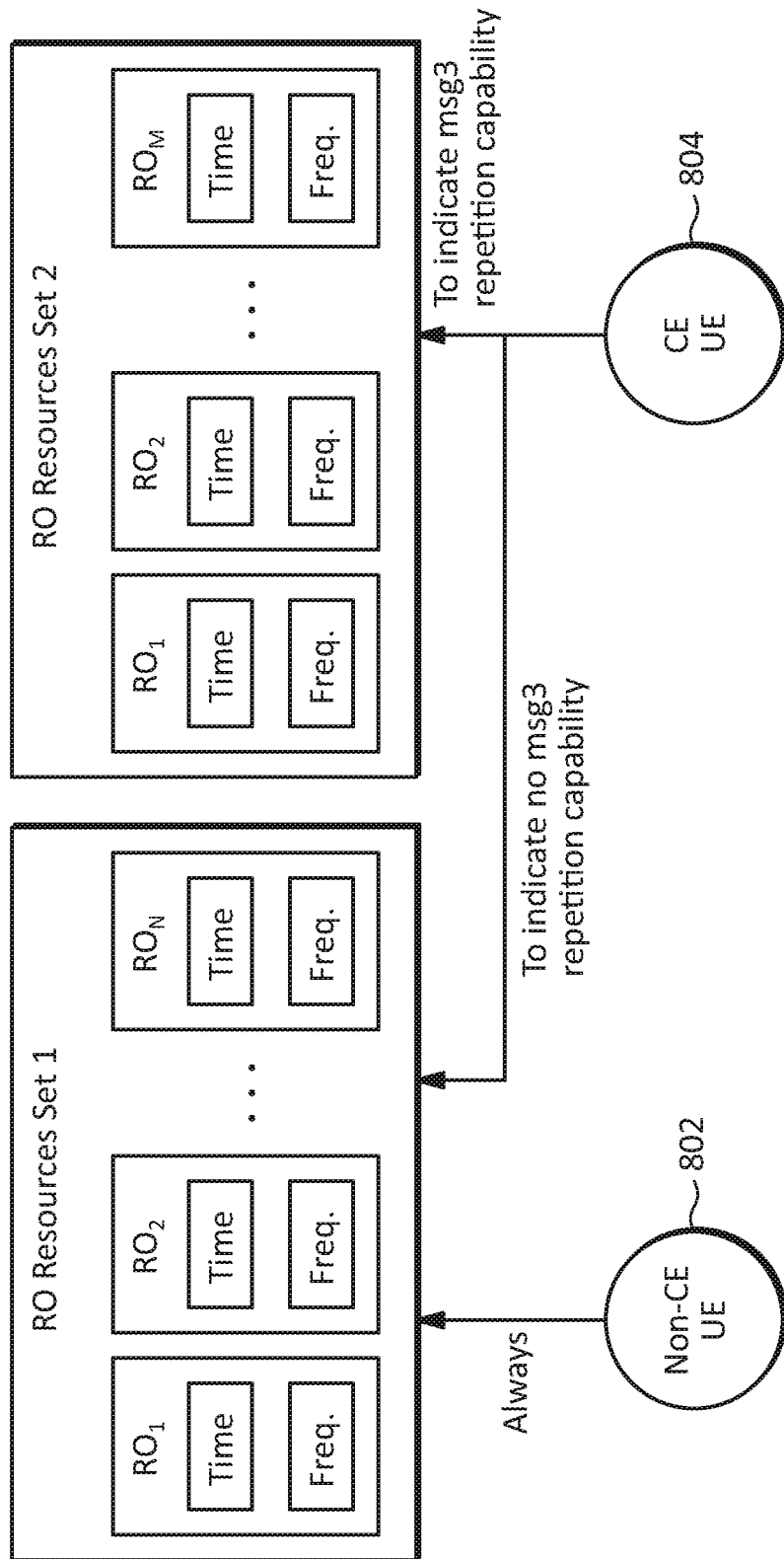
FIG. 8 illustrates an example of a scheme for using resource sets to indicate a UE capability such as the ability to send a contention resolution message with repetitions in accordance with example embodiments of the disclosure.

FIG. 8 illustrates an example of a scheme for using resource sets to indicate a UE capability such as the ability to send a contention resolution message with repetitions in accordance with example embodiments of the disclosure. The embodiment illustrated in FIG. 8 may be described in the context of an NR system, but the principles may be applied to any other wireless network with RA procedures.

Referring to FIG. 8, for each synchronization signal block (SSB), two sets of time/frequency resources may be configured for preamble transmission (e.g., during a 4-step RACH procedure). One set (e.g., set 1 which may include resource sets $RO1_1$ through $RO1_N$) may be used to indicate that the UE may not have CE capabilities to report to a gNB, while another set (e.g., set 2 which may include resource sets $RO2_1$ through $RO2_M$) may be used to indicate that the UE may have CE capabilities (e.g., the ability to send msg3 with repetitions) to report to the gNB. A UE without CE capabilities (non-CE UE) 802 may select a set of resources from set 1 and use the selected resources to send a preamble to the gNB to indicate a lack of one or more CE capabilities. Alternatively, a UE with CE capabilities 804 may select a set of resources from set 2 and use the selected resources to send a preamble to the gNB to indicate the presence of one or more CE capabilities such as the ability to send msg3 with repetitions.

Moreover, as shown in FIG. 8, a UE 804 having some CE capabilities may still use the illustrated scheme to indicate to the gNB that it may not have a specific capability (e.g., the ability to send msg3 with repetitions) by selecting a set of resources from set 1.

In some embodiments, a combination of preamble grouping and resource selection may be used to indicate a UE capability to a base station in accordance with example embodiments of the disclosure. For example, in some embodiments, some RO resources may be duplicated across both sets of RO resources, and when one of the duplicated RO resources are selected, preamble grouping may be used to differentiate between UE capabilities.

Resource Allocation for Contention Resolution Message Repetitions

In some wireless networks in accordance with example embodiments of the disclosure, at least some resources for sending contention resolution messages with repetitions may be allocated independently, in a coupled manner, or in any other suitable manner. Moreover, at least some resources for sending contention resolution messages with repetitions may be allocated dynamically, semi-statically, or in any other suitable manner.

For purposes of illustration, a msg3 transmission in an NR system may be scheduled such that a UE may send an initial msg3 followed by K−1 repetitions of msg3. (Thus, a total of K instances of the msg3 payload may be sent from the UE to the gNB). Each of these instances of msg3 may be sent using a specified set of resources which may include time/frequency resources, demodulation reference signal (DMRS) resources, and/or the like, as well as and a PUSCH transmission configuration which may include an MCS value, an RV index, and/or the like. (Thus, in some embodiments, a channel configuration such as a PUSCH transmission configuration may be considered part of a set of resources.)

In some embodiments, the gNB may schedule a msg3 transmission with repetitions where the set of resources (including PUSCH configurations) used for each of the instances of msg3 (e.g., the initial sending of msg3 and any repetitions of msg3) may be configured independently. For example, each instance of msg3 may have different time/frequency resources, DMRS resources, MCS value, RV index, and/or the like. These resources (including configuration parameters) for one instance of msg3 may or may not coincide with the corresponding values of another instance. Such an allocation may provide the gNB with flexibility to improve or optimize the UE sending of the instances of msg3. For example, the gNB may inform the UE to use an increasing amount of resources for each repetition of msg3 in an attempt to increase the likelihood of the UE to successfully delivering msg3. As another example, the gNB may change the allocated resources of the UE for the repetitions of msg3 to better fit the scheduling considerations of the gNB.

Figure 9:
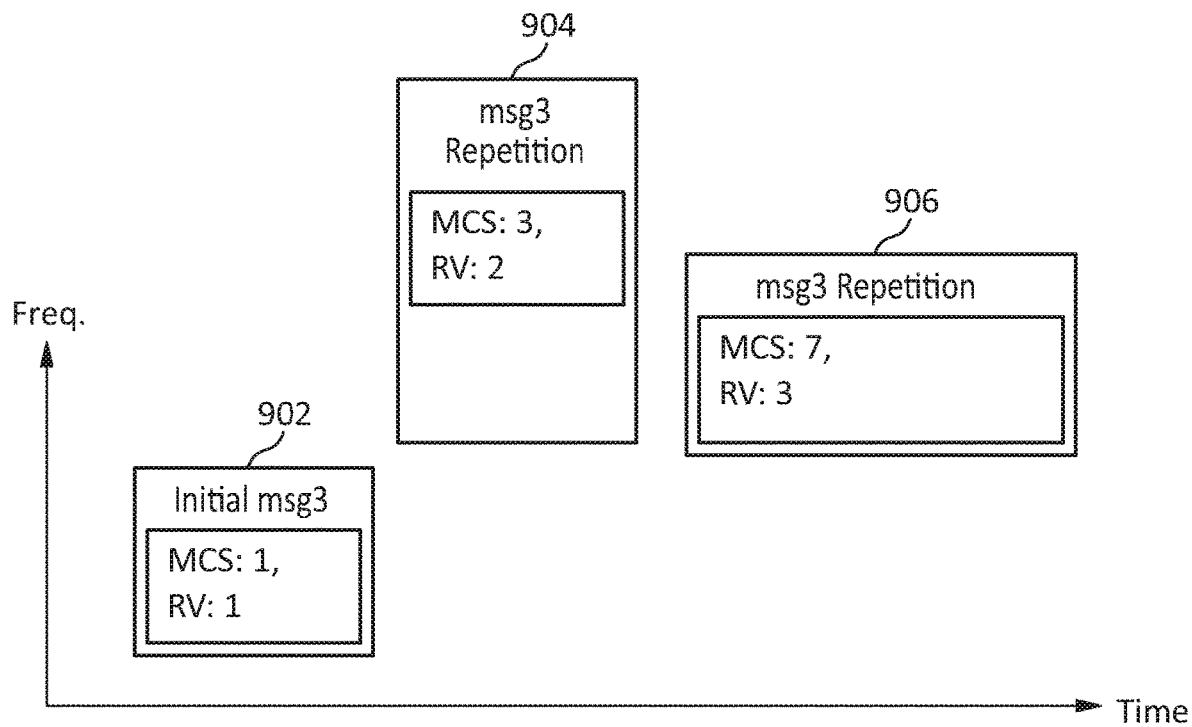
FIG. 9 illustrates an example of a scheme for sending a contention resolution message with repetitions using independent resource allocation in accordance with example embodiments of the disclosure.

FIG. 9 illustrates an example of a scheme for sending a contention resolution message with repetitions using independent resource allocation in accordance with example embodiments of the disclosure. The embodiment illustrated in FIG. 9 may be described in the context of an NR system, but the principles may be applied to any other wireless network with RA procedures.

In the embodiment illustrated in FIG. 9, a first instance of msg3 (e.g., an initial msg3) 902 may be sent with first time and frequency resources as indicated by the time and frequency axes, as well as resources MCS:1 and RV:1. A second instance of msg3 (e.g., a first repetition of msg3) 904 may be sent with second time and frequency resources as indicated by the time and frequency axes, as well as resources MCS:3 and RV:2. A third instance of msg3 (e.g., a second repetition of msg3) 906 may be sent with third time and frequency resources as indicated by the time and frequency axes, as well as resources MCS:3 and RV:3. Thus, resources for sending all three instances of msg3 may be allocated independently.

Figure 10:
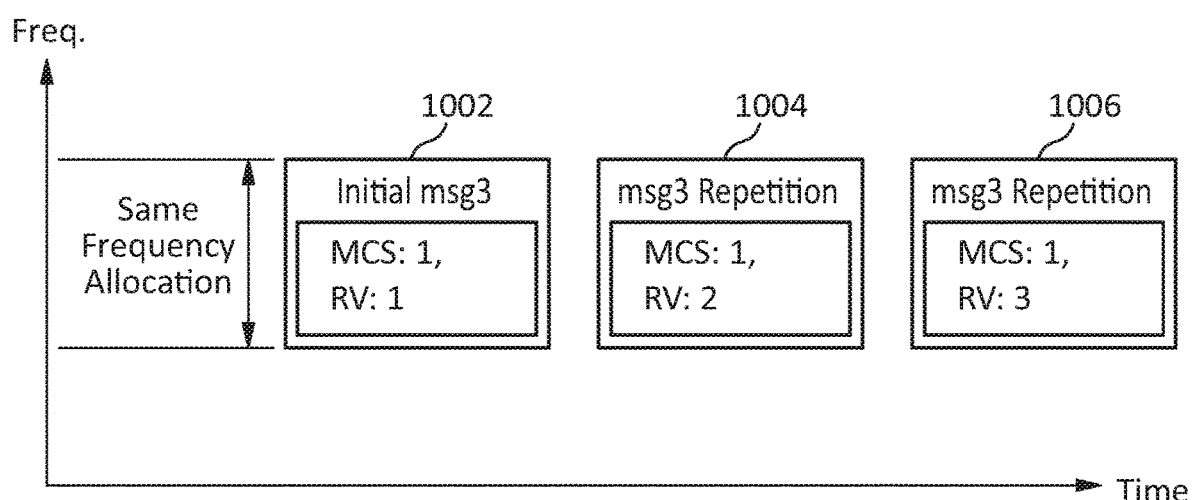
FIG. 10 illustrates an example of a scheme for sending a contention resolution message with repetitions using coupled resource allocation in accordance with example embodiments of the disclosure.

In some other embodiments, a gNB may configure sets of resources (which may include PUSCH configurations) for repetitions of msg3 in a coupled manner. For example, multiple instances of msg3 may be configured to be sent with the same or similar sets of resources (which may include PUSCH transmission configurations). For example, a gNB may allocate the same frequency resources for all instances of msg3 while varying the time resources for each instance or vice versa. As another example, the gNB may allocate different frequency resources for repetitions within two groups of repetitions, while allocating the same frequency resources for all repetitions within each group. Similar techniques may be used for configuring other resource parameters such as MCS value, RV index, and/or the like for repetitions, FIG. 10 illustrates an example of a scheme for sending a contention resolution message with repetitions using coupled resource allocation in accordance with example embodiments of the disclosure. The embodiment illustrated in FIG. 10 may be described in the context of an NR system, but the principles may be applied to any other wireless network with RA procedures.

In the embodiment illustrated in FIG. 10, a first instance of msg3 (e.g., an initial msg3) 1002 may be sent with time and frequency resources as indicated by the time and frequency axes, as well as resources MCS:1 and RV:1. A second instance of msg3 (e.g., a first repetition of msg3) 1004 may be sent with the same time and frequency resources as the first instance 1002 as indicated by the time and frequency axes, as well as the same MCS value (MCS:3) but a different RV value (RV:2). A third instance of msg3 (e.g., a second repetition of msg3) 1006 may be sent the same time and frequency resources as instance 1002 as indicated by the time and frequency axes, as well as the same MCS value (MCS:3) but a different RV value (RV:3). Thus, the initial msg3 and both repetitions of msg3 may be sent with the same time and frequency resources and MCS value, but different RV values.

In some embodiments, and depending on the implementation details, the independent and/or coupled allocation techniques described herein may reduce the overhead incurred when specifying the resource allocation for msg3 repetitions to the UE, and/or may provide a simple resource allocation mechanism.

In some wireless networks in accordance with example embodiments of the disclosure, a base station may indicate resources to be used by a UE for sending a contention resolution message with repetitions dynamically. For example, in an NR system, the allocated resources may be changed each time the UE performs 4-step RACH and attempts a msg3 transmission. Because the resources for msg3 allocations may be indicated to the UE each time the UE performs a 4-step RACH (e.g., dynamic scheduling which may also be referred to as allocation or configuration), information about the resource allocation may be sent to the UE dynamically.

In some wireless networks in accordance with example embodiments of the disclosure, various techniques may be used to indicate scheduling information to a UE for sending a contention resolution message with repetitions. For example, in some embodiments, a UE may be sent information about resource allocation in the UL grant scheduling msg3. In such an embodiment, the UL grant may include information such as the number of instances (K) of msg3, the time and frequency resources used for each instance, and/or other information about the PUSCH configuration associated with each instance of msg3. In some other embodiments, a UE may be provided with the information to indicate resource allocation via the scheduling DCI of msg2. For example, the DCI format used for scheduling msg2 transmissions may carry fields that may include information to inform the UE of the resource allocations and PUSCH configurations of the initial sending of msg3 and one or more repetitions.

In some other embodiments, a gNB may inform a UE semi-statically of the resources to use for sending an initial msg3 and repetitions of msg3. For example, the UE may be provided with information about the resource allocation for msg3 transmissions via, e.g., RRC signaling. In such an embodiment, for any attempted 4-step RACH by the UE, while such resource allocation is configured, the UE may attempt to send an initial msg3 and any repetitions of msg3 using a resource allocation that may be pre-configured. For example, the UE may be provided with information about a PUSCH configuration for a set of K msg3 instances such as the MCS value, RV index, and/or the like. Additionally, the UE may be provided with time/frequency resources to be used for the set of K msg3 instances. In such an embodiment, when the UE attempts to send an initial msg3 and one or more repetitions of msg3 during a 4-step RACH procedure, the UE may then pre-configured resources (which may include PUSCH configurations).

In some further embodiments, a gNB may indicate the resources for a UE to use for sending an initial msg3 and repetitions using a combination of dynamically-indicated information and semi-statically-indicated information. For example, the UE may be configured with some information about the resource allocation (which may include a PUSCH configuration) to be used for msg3 via, for example, RRC signaling. Additionally, the gNB may indicate to a UE some other information about the resource allocations (which may include a PUSCH configuration) to be used for msg3 while the msg3 transmission is being scheduled via, for example, a UL grant and/or scheduling DCI. For example, a UE may be pre-configured with an MCS value and/or an RV index to be used for sending msg3, while being informed dynamically with information related to the time/frequency resource allocations to be used for sending msg3.

Conveying Resource Allocation

In some wireless networks in accordance with example embodiments of the disclosure, various techniques may be used to represent resource allocations and/or convey information about such resource allocations to a UE, a base station, and/or the like.

For example, in some embodiments of an NR system, a gNB may convey to the UE a collection of resource allocations (which may include PUSCH configuration parameters), where each item in the collection may correspond to resources for one transmission of msg3 which may include the initial msg3 and any repetitions. In some other embodiments, each item in the collection may correspond to resources for one instance of msg3, where an instance of msg3 may refer to an initial msg3 or any repetition of msg3 Thus, in these embodiments, one item may be for sending an initial msg3, a second item may be for sending a first repetition of msg3, and a third item may be for sending a second repetition of msg3.

In some embodiments, for purposes of illustration, a collection of resource allocations may be referred to as a list, however, the representation is not necessarily limited to lists and may be implemented with any suitable technique for representing information on a collection of resource allocations.

In some example embodiments, each item in a list may include one or more variables to inform the UE of the resource allocations that may be used to send a contention resolution message. For example, a gNB may decide to schedule a UE to send K instances of msg3 (e.g., a first msg3 and K–1 repetitions of msg3). To implement this, the gNB may send to the UE a list that may include K items, where each item may include configuration information for sending a corresponding instance of msg3. Thus, a list may directly contain the configuration information to be used by the UE for sending msg3 instances. A list may be conveyed to the UE through a UL grant, a DCI, and/or any other mechanism. Depending on the implementation details, this type of embodiment may provide flexibility, for example, in terms of configuring the transmissions of msg3. In some embodiments, the length of such a list (e.g., the number of items in the list) may indicate the number of instances K of a contention resolution message, and therefore a dedicated variable for K may be omitted.

In some other example embodiments, a gNB can provide the UE with one or more indices to one or more configuration lists that may be pre-configured with resource allocations. For example, a list may include a collection of items, where each item may include configuration information that may be used to send a potential instance of msg3. The gNB may then provide to the UE one or more indices to one or more entries of the one or more configuration lists, where the indices may indicate which entries are to be used with the scheduled msg3 instances. Thus, the one or more lists may contain one or more sets of potential configuration information, where a set or subset may later be selected based on one or more indices. The one or more indices may be provided to the UE, for example, semi-statically (e.g., through RRC signaling and/or the like), dynamically (e.g., through a UL grant, DCI, and/or the like) or through any other suitable mechanism. As mentioned above, the use of lists in this context is for purposes of illustration, and the pre-configured information may be represented in any suitable form.

In some embodiments, a UE may be configured with a list of possible resources including time and/or frequency resources, and/or resources based on any other parameters. A gNB may then convey to the UE an index which may map to an entry in such a list that determines the resources to be used for sending a contention resolution message. Such a list may also be used to indicate a number of repetitions, for example, by one or more adding entries corresponding to the number of repetitions. In some embodiments, a UE may also be configured with different lists, and various parameters may be used as indices to different lists and/or tables. The collective use of these lists and indices may allow the UE to determine the resources to use for sending some or more instances of a contention resolution message.

Figure 11:
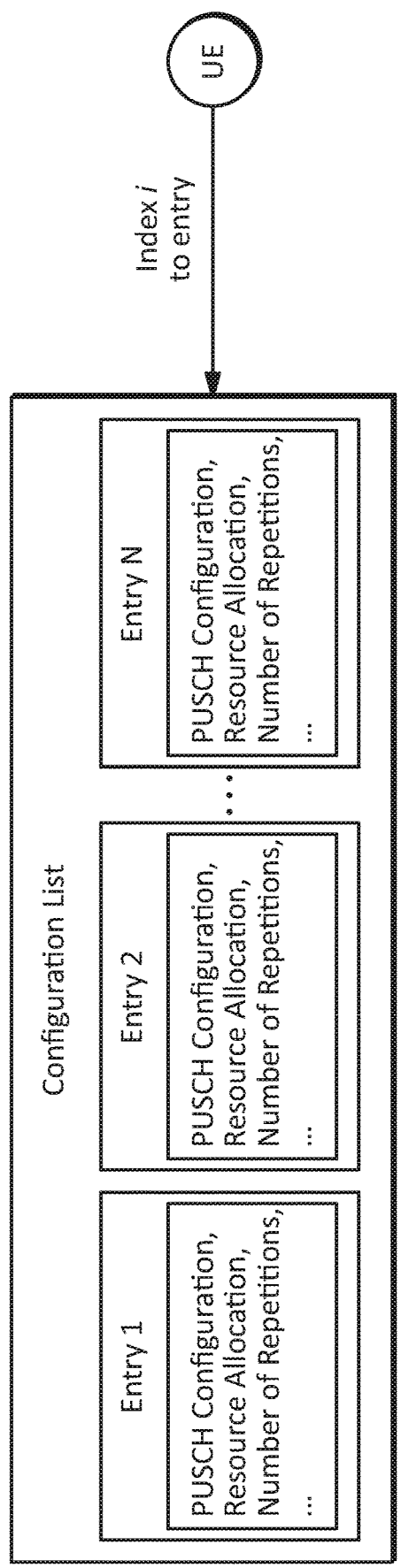
FIG. 11 illustrates an example of a scheme for representing and/or conveying resource allocations using a list in accordance with example embodiments of the disclosure.
Figure 12:
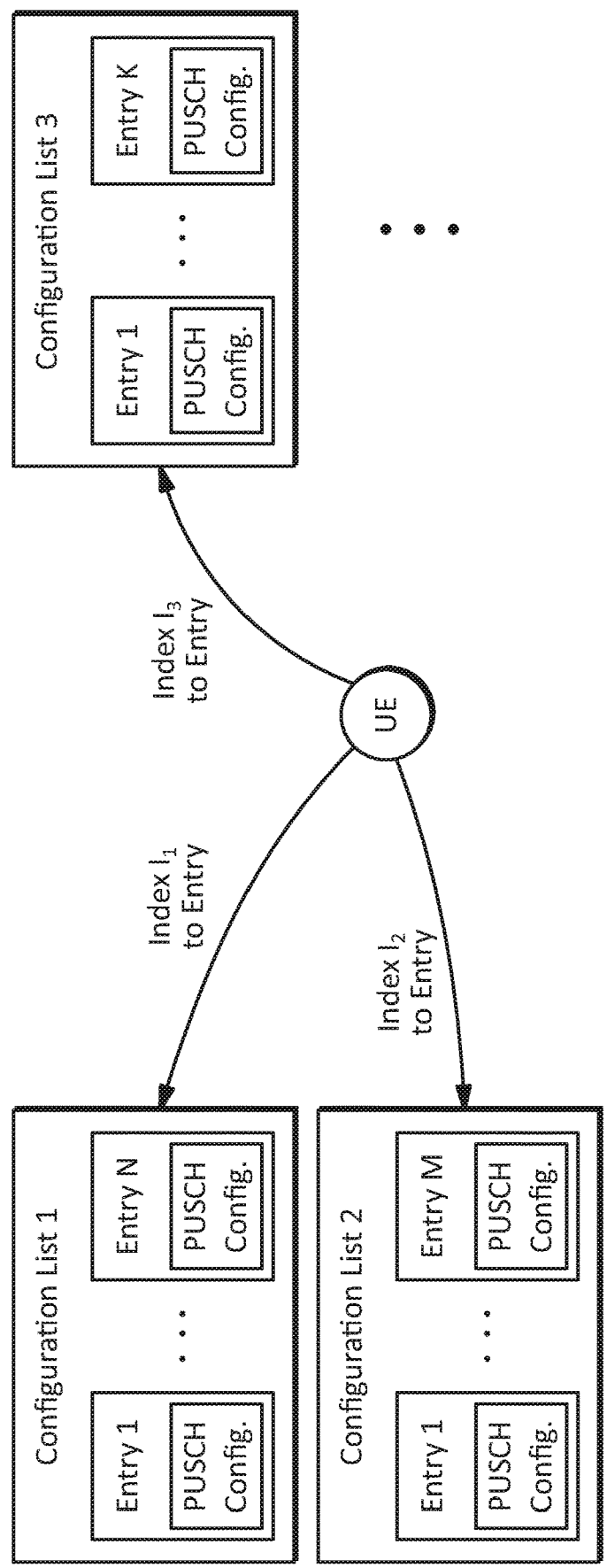
FIG. 12 illustrates an example of a scheme for representing and/or conveying resource allocations using multiple lists in accordance with example embodiments of the disclosure.

FIG. 11 illustrates an example of a scheme for representing and/or conveying resource allocations using a list in accordance with example embodiments of the disclosure. FIG. 12 illustrates an example of a scheme for representing and/or conveying resource allocations using multiple lists in accordance with example embodiments of the disclosure. The embodiments illustrated in FIGS. 11 and 12 may be described in the context of an NR system, but the principles may be applied to any other wireless network with RA procedures.

In the embodiment illustrated in FIG. 11, a configuration list may include multiple entries (e.g., entry 1, entry 2, . . . entry N). Each entry may include one or more resources to use for sending a contention resolution message with repetitions. A base station such as a gNB may provide a UE with an index I that the UE may use to determine which entry contains the resources to use.

In the embodiment illustrated in FIG. 12, multiple configuration lists (e.g., configuration list 1, configuration list 2, configuration list 3, etc., may each include multiple entries (e.g., entries 1 . . . N in configuration list 1, entries 1 . . . M in configuration list 2, entries 1 . . . K in configuration list 3, etc.) A base station such as a gNB may provide a UE with one or more indices $I_1$, $I_2$, $I_3$, etc., that the UE may use to determine which entry or entries contains the resources to use for sending a contention resolution message with repetitions.

In some embodiments, an example of a configuration list that may be used to represent and/or convey information about resource allocation for sending a contention resolution message with repetitions may be a PUSCH time allocation resource table. A PUSCH time allocation table may include a collection of possible time allocations that a UE may use for PUSCH transmissions based on one or more indications from a gNB. For example, when a PUSCH is scheduled by a gNB, the gNB may provide the UE with an index to the PUSCH time allocation table which indicates which time resource allocations to be used for this particular PUSCH.

Table 2 illustrates an example of a time allocation table that may be used for scheduling msg3 with repetitions in accordance with example embodiments of the disclosure, Each row in Table 2 may indicate a PUSCH mapping type, the parameter $K_2$, the start symbol S, the length of the PUSCH duration L, and/or the number of repetitions (which may include the initial sending of msg3 and any repetitions). Table 3 illustrates some configurations for the parameter j shown in Table 2.

TABLE 2

| Row index | PUSCH mapping type | $K_2$ | S | L | Number of Repetitions |
|---|---|---|---|---|---|
| 1 | Type A | j | 0 | 14 | 3 |
| 2 | Type A | j | 0 | 12 | 3 |
| 3 | Type A | j | 0 | 10 | 3 |
| 4 | Type B | j | 2 | 10 | 3 |
| 5 | Type B | j | 4 | 10 | 2 |
| 6 | Type B | j | 4 | 8 | 2 |
| 7 | Type B | j | 4 | 6 | 2 |
| 8 | Type A | j + 1 | 0 | 14 | 2 |
| 9 | Type A | j + 1 | 0 | 12 | 3 |
| 10 | Type A | j + 1 | 0 | 10 | 3 |
| 11 | Type A | j + 2 | 0 | 14 | 3 |
| 12 | Type A | j + 2 | 0 | 12 | 3 |
| 13 | Type A | j + 2 | 0 | 10 | 2 |
| 14 | Type B | j | 8 | 6 | 2 |
| 15 | Type A | j + 3 | 0 | 14 | 2 |
| 16 | Type A | j + 3 | 0 | 10 | 2 |

TABLE 3

| $\mu_{PUSCH}$ | j |
|---|---|
| 0 | 1 |
| 1 | 1 |
| 2 | 2 |
| 3 | 3 |

In some embodiments, Table 2 may be used a UE and gNB to schedule msg3 with repetitions if the UE indicates (for example, through preamble grouping and/or RO index as described above) that it is capable of sending msg3 with repetition. An index to the PUSCH time allocation resource table may then point to an entry in that table that may give the UE the necessary information to determine time allocations for msg3 transmissions. In some embodiments, the gNB may configure the UE with two separate PUSCH time allocation tables, for example, one without the "number of repetitions" for scheduling PUSCH operations for UEs without CE capabilities such as msg3 repetitions, and one with an additional "number of repetitions" field for msg3 scheduling with repetitions. In some alternative embodiments, a single table with a "number of repetitions" field may be used. In this case, the "number of repetitions" may be ignored by UEs without CE capabilities, and by UEs with the capability of sending msg3 with repetitions.

In some embodiments, one or more of the methods described above for the use of a PUSCH time allocation table may provide the gNB with the ability to schedule a UE to send msg3 with repetition. However, in some situations, if a UE indicates msg3 repetition capability, it may still be beneficial for the gNB to schedule msg3 without repetitions if the gNB decides to do so. To accommodate this type of situation, the gNB may indicate to the UE which "time allocation table" may be used for sending msg3 (in case two separate tables are configured) or whether to use the "number of repetitions" field (in case a single table with a "number of repetitions" field is used). This indication may be given dynamically to the UE (e.g., in a UL grant or in a scheduling DCI) or it may be configured semi-statically. For example, this indication may be implemented by using a one-bit field (e.g., in the UL grant or the scheduling DCI, or as an additional RRC parameter). In this example, if the bit has a first value, no repetition may be used, and if it has the opposite value, then repetition may be used.

In some further embodiments of a mechanism for time resource allocations of msg3 with repetitions, one or more time resource allocations for repetitions may be determined by determining a number K of instances of msg3 and time offset t between two consecutive transmissions. The time offset t can be expressed, for example, in terms of time units such as symbols, slots or subframes. In such an embodiment, the assumed Sub-Carrier Spacing (SCS) when determining the time offset may be based on the active Bandwidth Part (BWP) or another SCS which may be explicitly and dynamically indicated to the UE (e.g., in the UL grant or scheduling DCI) or semi-statically configured (e.g., through RRC). The time offset t may also be provided, for example, through an additional field in the time allocation table, and/or as a separate parameter specified dynamically or semi-statically.

In some further embodiments of a mechanism for time resource allocations of msg3 with repetitions, one or more frequency resource allocations for repetitions may be determined by determining a frequency offset f between two consecutive transmissions. The frequency offset f may be expressed, for example, in terms of Physical Resource Blocks (PRBs) or partial PRBs. In such an embodiment, the assumed SCS may also be based on the active BWP or another SCS which is explicitly and dynamically indicated to the UE (e.g., in the UL grant or scheduling DCI) or semi-statically configured (e.g., through RRC). The frequency offset f may also be provided, for example, through an additional field in the frequency allocation table, or as a separate parameter specified dynamically or semi-statically.

Monitoring Responses with Repetitions

In some wireless networks in accordance with example embodiments of the disclosure, a UE may monitor for a response from a base station, for example, by continuously monitoring after sending an initial contention resolution message, and stopping after a RAR window duration after sending the last repetition of the contention resolution message. In some embodiments in which a UE may not be able to perform simultaneous UL and DL transmissions, one or more monitoring durations may exclude the times used by the UE for retransmissions and/or adhering to a timeline (e.g., accounting for switching time, and/or the like). In some other embodiments, the UE may only begin monitoring for a response from the base station after sending the final repetition of the contention resolution message.

In some embodiments of an NR system, a UE may start a monitoring window having a duration determined by the parameter ra-ContentionResolutionTimer, during which it may monitor for a DCI format 1_0 scheduling the PDSCH carrying msg4.

In a first embodiment of a system that may allow msg3 to be sent with repetitions, the UE may start the monitoring window after the end of sending the initial msg3. Depending on the implementation details, this may allow the UE to efficiently complete the RACH procedure after at least one instance of msg3 is correctly received by the gNB. In such an embodiment, the duration of the window may be set sufficiently long to account for possible msg4 transmissions in response to both the initial msg3 and the repetitions of msg3. This may be implemented, for example, by setting the parameter ra-ContentionResolutionTimer to a large enough value to accommodate the necessary duration. Alternatively, this may be implemented by allowing the monitoring window to restart after sending each msg3 repetition. In some embodiments, the UE may be allowed to switch between sending msg3 repetitions and monitoring PDCCH occasions. Depending on the implementation details, this may introduce a sufficient timeline to account for a switching time constraint of the UE.

In a first embodiment of a system that may allow msg3 to be sent with repetitions, the UE may start the monitoring window after the end of the last msg3 repetition. Depending on the implementation details, this may simplify the procedure, for example, in terms of UE implementation.

Power Adaptation for Contention Resolution Messages

In some wireless networks in accordance with example embodiments of the disclosure, a UE may perform power adaptation while sending contention resolution messages. In some embodiments, multiple sets of power adaptation parameters may be configured. For example, a first set of power adaptation parameters may be used for UEs that may have certain CE capabilities such as sending contention resolution messages with repetitions, while a second set of power adaptation parameters may be used for UEs that may not have one or more CE capabilities.

In some embodiments, each set of power adaptation parameters may include a collection of parameters that may be used for power adaptation. In an NR system, examples of such parameters may include powerRampingStep, msg3-Delta, msg3-Alpha and/or powerRampingStep. Any or all of the parameters may be the same or different among sets. In some embodiments, the gNB may indicate to the UE which set of parameters to use, for example, in a DCI scheduling msg3 and its repetitions. Such an indication may be implemented, for example, in the scheduling DCI or in the UL grant. In some embodiments, the UE may also revert to a pre-configured set of parameters if no indication is provided in the UL grant or in the scheduling DCI.

In some embodiments, a UE may have a UE capability that may indicate how many different power adaptation parameter sets it can support for msg3. In such an embodiment, the UE may then indicate this capability to the gNB, for example, via preamble grouping, RO extensions, and/or the like.

In some embodiments, when scheduling msg3, a gNB may inform the UE of which power adaptation parameter set to use when sending an initial msg3 and/or repetitions of msg3. In some embodiments, a gNB may be limited to indicating to the UE only parameter sets the UE may actually use (for example, according to a UE capability that the UE has indicated to the gNB). In some other embodiments, the gNB may indicate a parameter set to use regardless of the UE's capability so use the parameter set; in this case, in some implementations, the UE may choose another set of parameters to use which matches its UE capability.

User Equipment

Figure 13:
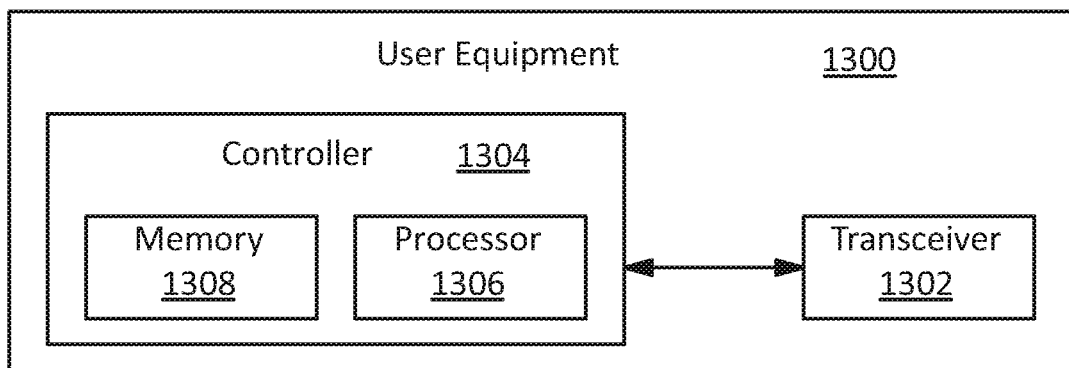
FIG. 13 illustrates an example embodiment of a UE in accordance with example embodiments of the disclosure.

FIG. 13 illustrates an example embodiment of a UE in accordance with example embodiments of the disclosure. The embodiment 1300 illustrated in FIG. 13 may include a radio transceiver 1302 and a controller 1304 which may control the operation of the transceiver 1302 and/or any other components in the UE 1300. The UE 1300 may be used, for example, to implement any of the UE functionality described in this disclosure such as UE random access functionality, sending contention resolution messages with repetitions, and/or the like.

The transceiver 1302 may transmit/receive one or more signals to/from a base station, and may include an interface unit for such transmissions/receptions. For example, the transceiver 1302 may receive MIB/SIB information, random access related configuration information, and/or one or more synchronization signals from a base station. It may transmit one or more random access preambles, PRACH, PUSCH, or PUCCH transmissions to a base station. It may receive responses thereto from the base station, for example, msg2 and/or msg4 transmissions, RARs, and/or the like using PDSCH, PDCCH, and/or the like.

The controller 1304 may include, for example, one or more processors 1306 and a memory 1308 which may store instructions for the one or more processors 1306 to execute code to implement any of the UE functionality described in this disclosure. For example, the controller 1304 may be used to implement a method for sending contention resolution messages with repetitions. In some embodiments, the controller 1304 may be used to implement, may be implemented as, may include, and/or may be included as part of, a medium access control (MAC) layer.

Base Station

Figure 14:
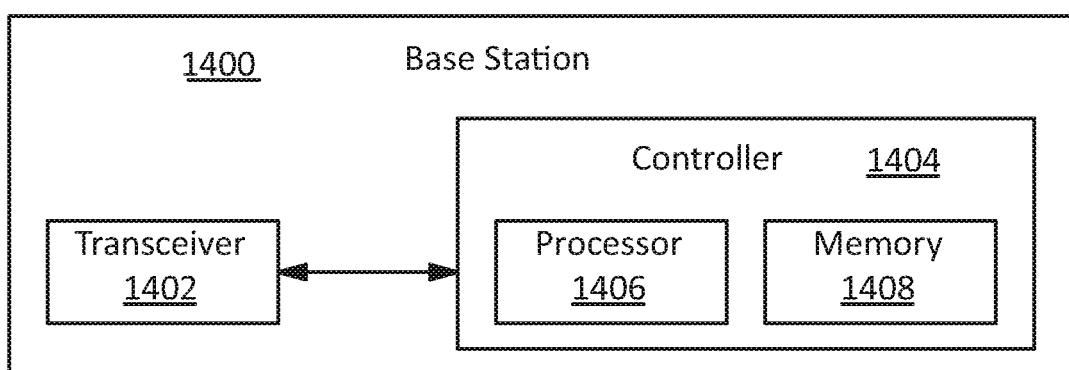
FIG. 14 illustrates an example embodiment of a base station in accordance with example embodiments of the disclosure.

FIG. 14 illustrates an example embodiment of a base station in accordance with example embodiments of the disclosure. The embodiment 1400 illustrated in FIG. 14 may include a radio transceiver 1402 and a controller 1404 which may control the operation of the transceiver 1402 and/or any other components in the base station 1400. The base station 1400 may be used, for example, to implement any of the base station functionality described in this disclosure such as base station random access functionality, receiving contention resolution messages with repetitions, and/or the like.

The transceiver 1402 may transmit/receive one or more signals to/from a base station, and may include an interface unit for such transmissions/receptions. For example, the transceiver 1402 may transmit MIB/SIB information, random access related configuration information, and/or one or more synchronization signals to a UE. It may receive one or more random access preambles, PRACH, PUSCH, or PUCCH transmissions, and/or the like from a UE. It may transmit responses thereto to the UE, for example, msg2 and/or msg4 transmissions, RAR, and/or the like using PDSCH, PDCCH, and/or the like.

The controller 1404 may include, for example, one or more processors 1406 and a memory 1408 which may store instructions for the one or more processors 1406 to execute code to implement any of the base station functionality described in this disclosure. For example, the controller 1404 may be used to implement one or more techniques for receiving contention resolution messages with repetitions from a UE. In some embodiments, the controller 1404 may be used to implement, may be implemented as, may include, and/or lay be included as part of, a medium access control (MAC) layer.

In the embodiment illustrated in FIGS. 13 and 14, the transceivers 1302 and 1402 may be implemented with various components to receive and/or transmit RF signals such as amplifiers, filters, modulators and/or demodulators, A/D and/or DA converters, antennas, switches, phase shifters, detectors, couplers, conductors, transmission lines, and/or the like. The controllers 1304 and 1404 may be implemented with hardware, software, and/or any combination thereof. For example, full or partial hardware implementations may include combinational logic, sequential logic, timers, counters, registers, gate arrays, amplifiers, synthesizers, multiplexers, modulators, demodulators, filters, vector processors, complex programmable logic devices (CPLDs), field programmable gate arrays (FPGAs), state machines, data converters such as ADCs and DACs, and/or the like. Full or partial software implementations may include one or more processor cores, memories, program and/or data storage, and/or the like, which may be located locally and/or remotely, and which may be programmed to execute instructions to perform one or more functions of the controllers.

Additional Embodiments

Figure 15:
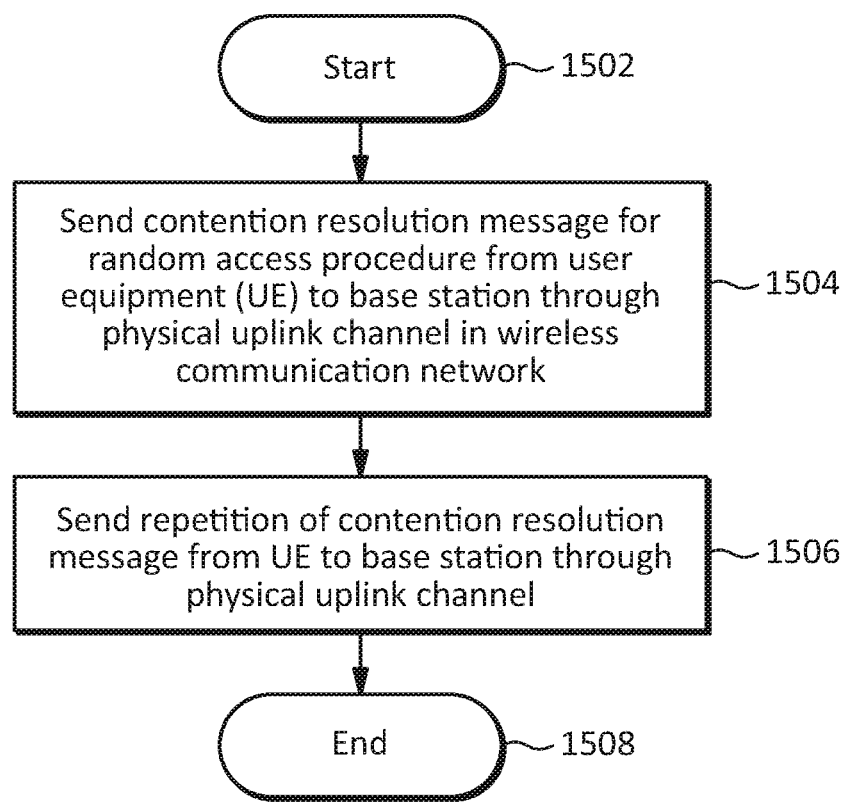
FIG. 15 illustrates an embodiment of a method for random access in a wireless communication network in accordance with example embodiments of the disclosure.

FIG. 15 illustrates an embodiment of a method for random access in a wireless communication network in accordance with example embodiments of the disclosure. The method may begin at operation 1502. At operation 1504, the method may send a contention resolution message for a random access procedure from a user equipment (UE) to a base station through a physical uplink channel in a wireless communication network. At operation 1506, the method may send a repetition of the contention resolution message from the UE to the base station through the physical uplink channel. The method may end at operation 1508.

In the embodiment illustrated in FIG. 15, the illustrated components and/or operations are exemplary only. Some embodiments may involve various additional components and/or operations not illustrated, and some embodiments may omit some components and/or operations. Moreover, in some embodiments, the arrangement of components and/or temporal order of the operations may be varied. Although some components may be illustrated as individual components, in some embodiments, some components shown separately may be integrated into single components, and/or some components shown as single components may be implemented with multiple components.

Although some embodiments have been described in the context of 5G and/or new radio (NR) wireless networks, the principles may be applied to any other types of systems having random access procedures, Thus, in some embodiments, PUSCH may refer to any physical uplink shared channel, PRACH may refer to any physical random access channel, gNB may refer to any type of base station, etc.

The embodiments disclosed herein may be described in the context of various implementation details, but the principles of this disclosure are not limited to these or any other specific details. Some functionality has been described as being implemented by certain components, but in other embodiments, the functionality may be distributed between different systems and components in different locations. A reference to a component or element may refer to only a portion of the component or element. The use of terms such as "first" and "second" in this disclosure and the claims may only be for purposes of distinguishing the things they modify and may not indicate any spatial or temporal order unless apparent otherwise from context. A reference to a first thing may not imply the existence of a second thing. Moreover, the various details and embodiments described above may be combined to produce additional embodiments according to the inventive principles of this patent disclosure. Various organizational aids such as section headings and the like may be provided as a convenience, but the subject matter arranged according to these aids and the principles of this disclosure are not defined or limited by these organizational aids.

Since the inventive principles of this patent disclosure may be modified in arrangement and detail without departing from the inventive concepts, such changes and modifications are considered to fall within the scope of the following claims.

The invention claimed is:

1. A method comprising:
   receiving, by a user equipment (UE) through a physical downlink channel in a wireless communication network, a scheduling message comprising a repetition value for a contention resolution message;
   sending, by the UE through a physical uplink channel in the wireless communication network, an initial contention resolution message for a random access procedure, wherein the initial contention resolution message comprises an indication whether the UE has a capability to send a number of repetitions; and
   sending, by the UE through the physical uplink channel in response to the sending of the initial contention resolution message, the number of repetitions of the contention resolution message corresponding to the repetition value.

2. The method of claim 1, wherein the physical uplink channel comprises a physical uplink shared channel (PUSCH).

3. The method of claim 1, further comprising:
   selecting a preamble from a first preamble group corresponding to the capability of the UE to send the repetitions of the contention resolution message; and
   sending the preamble from the UE.

4. The method of claim 3, wherein selecting the preamble from the first preamble group comprises selecting a preamble from a first preamble sub-group corresponding to the capability of the UE to send the repetitions of the contention resolution message.

5. The method of claim 1, further comprising:
   selecting a first set of resources for a preamble transmission corresponding to the capability of the UE to send the repetitions of the contention resolution message; and
   sending a preamble from the UE using the first set of resources.

6. The method of claim 1, wherein the initial contention resolution message is sent using a first set of resources.

7. The method of claim 6, wherein the repetitions of the contention resolution message are sent using a second set of resources.

8. The method of claim 7, wherein the first set of resources is configured substantially independently of the second set of resources.

9. The method of claim 7, wherein a portion of the first set of resources is configured substantially the same as a portion of the second set of resources.

10. The method of claim 7, wherein:
    the first set of resources comprises a first repetition value (RV); and
    the second set of resources comprises a second RV that is different from the first RV.

11. The method of claim 7, wherein:
    the first set of resources comprises a first RV; and
    the second set of resources comprises a second RV that is the same as the first RV.

12. The method of claim 6, wherein:
the first set of resources has a first configuration for a first transmission comprising the contention resolution message; and
the first set of resources has a second configuration for a second transmission comprising the contention resolution message, wherein the second configuration is substantially different from the first configuration.

13. The method of claim 6, wherein:
the first set of resources has a first configuration for a first transmission comprising the contention resolution message; and
the first set of resources has a second configuration for a second transmission comprising the contention resolution message, wherein the second configuration is substantially the same as the first configuration.

14. The method of claim 6, wherein the first set of resources comprises an RV index.

15. The method of claim 14, further comprising configuring the RV index dynamically.

16. The method of claim 14, further comprising configuring the RV index semi-statically.

17. The method of claim 6, wherein the first set of resources comprises a demodulation reference signal (DMRS) configuration.

18. The method of claim 6, further comprising sending to the UE an index to one or more resources of the first set of resources.

19. The method of claim 1, further comprising monitoring a response based on completion of sending the initial contention resolution message.

20. The method of claim 1, further comprising monitoring a response based on completion of sending the repetitions of the contention resolution message.

* * * * *